United States Patent
Madaan et al.

(10) Patent No.: US 11,481,661 B2
(45) Date of Patent: Oct. 25, 2022

(54) SEGMENTATION PLATFORM USING FEATURE AND LABEL PAIRS

(71) Applicant: VISA INTERNATIONAL SERVICE ASSOCIATION, San Francisco, CA (US)

(72) Inventors: Aman Madaan, Foster City, CA (US); Jagdish Chand, Foster City, CA (US); Somashekhar Pammar, Foster City, CA (US); Venkata Sesha Rao Polavarapu, Foster City, CA (US); Kingdom Iweajunwa, Foster City, CA (US); Sunil Sharma, Foster City, CA (US); Tarun Jain, Foster City, CA (US); Dirk Reinshagen, Foster City, CA (US); Derek Vroom, Foster City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 901 days.

(21) Appl. No.: 15/436,458

(22) Filed: Feb. 17, 2017

(65) Prior Publication Data

US 2018/0240020 A1    Aug. 23, 2018

(51) Int. Cl.
*G06N 20/00* (2019.01)
*G06F 16/2458* (2019.01)
*G06Q 10/04* (2012.01)

(52) U.S. Cl.
CPC ......... *G06N 20/00* (2019.01); *G06F 16/2465* (2019.01); *G06Q 10/04* (2013.01)

(58) Field of Classification Search
CPC ............................ G06N 20/00; G06F 16/2465
See application file for complete search history.

(56) References Cited

U.S. PATENT DOCUMENTS

| | | | |
|---|---|---|---|
| 7,165,037 B2 | 1/2007 | Lazarus et al. | |
| 7,882,135 B2 | 2/2011 | Brunner et al. | |
| 9,280,749 B1 * | 3/2016 | Porteous | G06F 21/6218 |

(Continued)

OTHER PUBLICATIONS

Fu et al., "Leveraging Supervised Label Dependency Propagation for Multi-Label Learning," IEEE (2013) (Year: 2013).*

(Continued)

*Primary Examiner* — Kakali Chaki
*Assistant Examiner* — Kevin L. Smith
(74) *Attorney, Agent, or Firm* — Kilpatrick Townsend & Stockton LLP

(57) ABSTRACT

A segmentation platform enables a system that comprises a behavior service and a predictive service for determining a segment from a dataset. The behavior service can analyze data to determine information about behavior that has already occurred. The predictive service can analyze data to determine information about the predicted propensity for certain behavior to occur in the future. In some cases, the predictive service can determine the information by utilizing a training model that indicates predictions related to potential relationships among properties of a dataset. The segmentation platform also enables an interactive user interface that can be utilized to configure attributes of the segment, analyze information associated with the segment, and deliver the information to another device.

20 Claims, 16 Drawing Sheets

(56) References Cited

U.S. PATENT DOCUMENTS

| | | | |
|---|---|---|---|
| 10,255,300 B1* | 4/2019 | Jhingran | G06Q 30/02 |
| 2005/0125434 A1* | 6/2005 | Fan | G06N 20/00 |
| | | | 707/999.102 |
| 2013/0006991 A1* | 1/2013 | Nagano | G10L 17/26 |
| | | | 707/E17.046 |
| 2014/0201126 A1* | 7/2014 | Zadeh | A61B 5/165 |
| | | | 706/52 |
| 2014/0222506 A1 | 8/2014 | Frazer et al. | |
| 2014/0279730 A1* | 9/2014 | Gamon | G06N 20/00 |
| | | | 706/12 |
| 2014/0337096 A1 | 11/2014 | Bilenko et al. | |
| 2015/0178596 A1* | 6/2015 | Bengio | G06N 7/005 |
| | | | 382/224 |
| 2015/0254469 A1* | 9/2015 | Butler | G06F 21/6218 |
| | | | 706/12 |
| 2016/0063389 A1* | 3/2016 | Fuchs | G06N 20/00 |
| | | | 706/12 |
| 2016/0078364 A1* | 3/2016 | Chiu | G06F 16/951 |
| | | | 706/11 |
| 2016/0078485 A1 | 3/2016 | Shim et al. | |
| 2017/0091270 A1* | 3/2017 | Guo | G06F 16/24544 |
| 2017/0329660 A1* | 11/2017 | Salunke | G06F 11/34 |

OTHER PUBLICATIONS

Druck et al., "Active Learning by Labeling Feature," Conf. on Empirical Methods in NLP (2009) (Year: 2009).*

Deepa Paranjpe, "Learning Document Aboutness from Implicit User Feedback and Document Structure," Yahoo! Labs (2009) (Year: 2009).*

Andrei Alexandrescu, "Scalable Graph-Based Learning Applied to Human Language Technology," University of Washington (2009) [Thesis] (Year: 2009).*

Nguyen et al., "A Bayesian Nonparametric Approach for Multi-label Classification," JMLR (2016) (Year: 2016).*

"Data Mining Techniques: A Source for Consumer Behavior Analysis", Abhijit Raorane & R. V. Kulkarni, Department of Computer Science, Vivekanand College (15 pages), downloaded May 3, 2017.

PCT/US2018/018571, "International Search Report and Written Opinion", dated Mar. 28, 2018, 12 pages.

Communication for Application No. EP 18707840.7 dated Jul. 3, 2020, 7 pages.

European Application No. 18 707 840.7, Summons to Attend Oral Proceedings dated Nov. 27, 2020, 9 pages.

* cited by examiner

SEGMENTATION PLATFORM USING FEATURE AND LABEL PAIRS

CROSS-REFERENCES TO RELATED APPLICATIONS

None.

BACKGROUND

With the rise of digital platforms, systems continuously collect and store electronic data. However, such systems are problematic for a number of reasons. In conventional systems, there is an overabundance of stored information with no effective way to utilize the information. This takes up unnecessary storage space, as well as computing resources to manage the information. Additionally, conventional systems typically do not provide mechanisms to effectively analyze large amounts of data. For example, such conventional systems that attempt to conduct analyses on large amounts of data are inefficient and cannot provide results within a reasonable amount of time.

Due to some of the reasons described above, conventional systems are not able to sufficiently analyze behavioral data. For example, conventional systems typically make predictions corresponding to a specific behavior based on historical information associated with the specific behavior. In some cases, a system may predict whether a user will visit a certain location based on whether they have visited the location in the past. However, this type of analysis is limiting because the system needs to possess enough historical data to conduct a proper prediction regarding the specific behavior. As a result, conventional systems are not able to effectively conduct predictive analysis regarding new or relatively unknown behaviors.

Embodiments of the invention address these and other problems, individually and collectively.

BRIEF SUMMARY

Embodiments of the invention are directed to a segmentation platform that comprises a behavior service and a predictive service for determining a segment from a dataset. One embodiment of the invention is directed to a method that can be performed by a computer. The method can comprise determining a dataset collected over a time period and determining a plurality of feature and label pairs associated with the dataset. The method may further comprise, for each of the plurality of feature and label pairs, determining whether the feature and label pair is significant and adding the feature and label pair to a training model upon determining that the feature and label pair is significant. The method may further comprise determining a set of predicted labels for an entity based on the training model and initiating an action based on the set of predicted labels. In some cases, the action may comprise sending one or more of a recommendation, an alert, or an offer to the entity.

In some embodiments, determining the plurality of feature and label pairs associated with the dataset may comprise performing some steps. The steps may include determining a feature dataset based on a first subset of the dataset and determining a label dataset based on a second subset of the dataset. The first subset corresponds to data collected at an earlier time within the time period than that of the data corresponding to the second subset. The steps may further include determining the plurality of feature and label pairs that co-occur based on the feature dataset and the label dataset.

In some implementations, determining that the feature and label pair, including a feature and a label, is significant can comprise performing some steps. The steps may include determining a probability of the label occurring in the dataset and determining a conditional probability of the label occurring in the dataset given the feature has occurred in the dataset. The steps may further include determining that the conditional probability is greater than the probability of the label occurring in the dataset.

In some embodiments, determining the set of predicted labels for the entity may comprise performing some steps. The steps may include determining a set of features associated with the entity. Further, the steps can include, for each of the features in the set of features, determining a feature and label pair in the training model that includes the feature and determining the label in the feature and label pair. In some embodiments, the steps may also comprise, for each of the features in the set of features, determining multiple feature and label pairs in the training model that include the feature and determining, from the multiple feature and label pairs, the feature and label pair that is associated with the largest conditional probability of the label occurring in the dataset given the feature has occurred in the dataset.

In some embodiments, the method can comprise further steps, where the dataset may be a first dataset. For example, the method can further comprise determining a second dataset corresponding to data collected after the time period. The method can further comprise evaluating the training model by determining a number of labels from the set of predicted labels occurring in the second dataset associated with the entity.

In some implementations, the method may involve bucketization. For example, the method may further comprise bucketizing data associated with the entity to determine bucketized values, generating combined bucketized data including the bucketized values, and storing the combined bucketized values. In some cases, bucketizing data associated with the entity may comprise, for each feature and label pair determined to be significant, bucketizing the conditional probability of the label occurring in the dataset given the feature has occurred in the dataset. In some embodiments, the method can further comprise receiving a query for information associated with the entity, obtaining the combined bucketized values, and determining the information based on the combined bucketized values.

Embodiments of the invention are also directed to a server computer comprising a processor and a computer readable medium coupled to the processor. The computer readable medium may comprise code executable to perform any method described herein.

DETAILED DESCRIPTION

Figure 1:
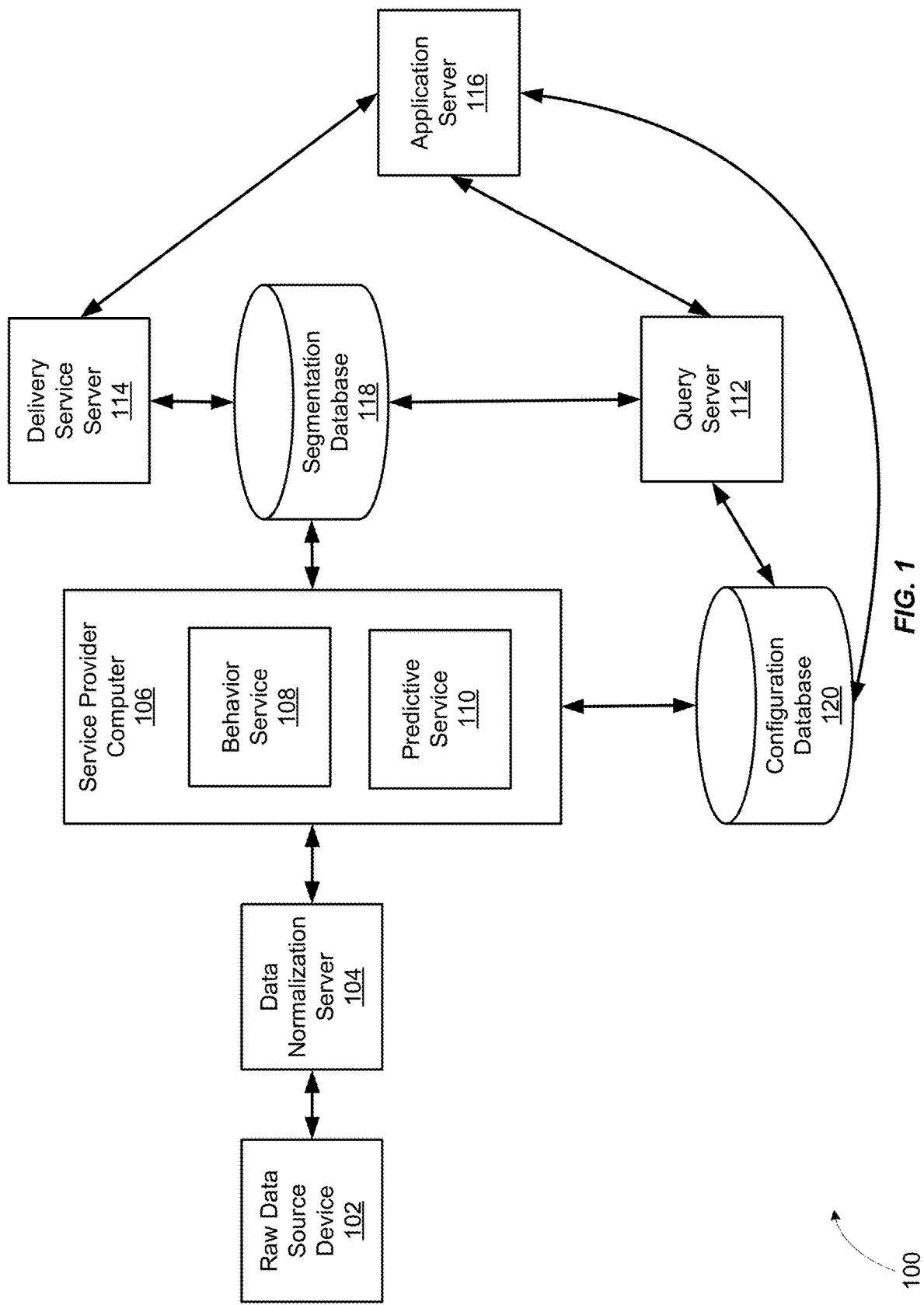
FIG. 1 shows an exemplary system according to some embodiments of the invention.

In conventional systems, there is an overabundance of information that is processed. Managing this information takes up unnecessary storage space, as well as other computing resources. To exacerbate the issue, conventional systems are not capable of effectively analyzing the information to derive useful data about certain entities or behaviors. In addition, conventional systems that attempt to conduct analyses on large amounts of information are inefficient and cannot provide results within a reasonable amount of time. Embodiments of the invention address these and other problems, individually and collectively.

Embodiments of the invention enable a system that comprises a behavior service and a predictive service for determining a segment from a dataset. The behavior service can analyze data to determine information about behavior that has already occurred. In some cases, the behavior service can aggregate or perform computations on raw data to determine certain behavior in a dataset. The predictive service can analyze data to determine information about the predicted propensity for certain behavior to occur in the future. In some cases, the predictive service can determine the information by utilizing a training model that indicates predictions related to potential relationships among properties of a dataset.

Embodiments of the invention also provide a software tool that includes a user interface for determining a segment. A user can enter input parameters and send a query using the user interface, which causes the system to call the behavior service or predictive service. The user interface can display the results comprising information associated with the segment determined by the behavior service or predictive service. This can assist the user in delivering analysis information to certain entities that may find the information useful (e.g., offer provider system, fraud analysis system, etc.). Since embodiments of the invention enable data to be stored in a condensed form, the system can retrieve data efficiently, even for queries involving a large amount of data. Storing the data in condensed form also enables storage space on the computer to be minimized without loss of ability to quantitatively analyze data.

Before discussing specific embodiments of the invention, some descriptions of some terms may be useful.

A "feature" or "label" may each be a property. In some cases, the feature or label may be any suitable property related to an entity. For example, the feature or label may be a name, size, location, category, or other characteristic. In some cases, the feature or label may be any suitable property related to an event associated with the entity. For example, the feature or label may be transaction data (e.g., timestamp, resource provider name, resource provider category, resource provider location, transaction amount, etc.) associated with a transaction conducted by the entity. In some cases, the feature or label can also be a characteristic derived from transaction data, such as the number of unique visits to a certain resource provider within a day. In another example, the feature or label may be any information (e.g., temperature, time of day, noise level, speed, etc.) related to a general action performed by the entity.

A "feature and label pair" includes a feature indicating one property and a label indicating another property. Typically, the feature of the feature and label pair can serve as an independent variable that is utilized to make a prediction, while the label of the feature and label pair can serve as a dependent variable that is being predicted. For example, a feature and label pair may include a feature indicating a resource provider name (e.g., merchant name) and a label indicating a resource provider category (e.g., merchant category code). An exemplary analysis can provide a prediction of a future occurrence of the merchant category code based on the occurrence of the resource provider name in a dataset.

A "feature dataset" can include one or more features extracted from a dataset. For example, for a feature of resource provider name (e.g., merchant name), the feature dataset may include all different types of resource provider names that exist in the dataset.

A "label dataset" can include one or more labels extracted from a dataset. For example, for a label of resource provider category (e.g., merchant category code), the label dataset may include all different types of resource provider categories that exist in the dataset.

A "training model" can be any suitable computational model that indicates information related to predictive relationships. A training model can be configured to receive training data and can indicate information related to potential predictive patterns in the training data. For example, the training model may indicate that a certain label is likely to occur based on the fact that a certain feature has occurred in a dataset. In some cases, the training model may be updated based on each set of data that it receives utilizing machine learning techniques.

A "set of predicted labels" can include one or more labels that are predicted to occur based on a dataset. In some cases, the set of predicted labels may be determined based on information indicated by a training model. For example, the set of predicted labels may be the one or more labels that are likely to occur given that a certain set of features has occurred in a dataset.

A "bucketized value" may be a value that is presented in a summarized form, rather than its raw value. In some cases, the bucketized value can be a value indicating a bucket with which it is associated. For example, the bucketized value can be a bucket index indicating a decile with which the raw value is associated. Any number of buckets can be utilized. In some cases, the bucketized value may be a key of a hash table. The bucketized value can also be any other suitable value that is related to a group with which it is associated. For example, the bucketized value may be a total, a mean, a median, a mode, or a range associated with a group of values.

A "combined bucketized value" can be data derived by combining multiple values, including bucketized values. The combined bucketized value may be in a form such that it can be stored using less, space than storing each of the multiple bucketized values separately. The multiple bucketized values may be combined using any suitable method. For example, the combined bucketized value may comprise a mapping of multiple bucketized values to associated data. In another example, the combined bucketized value can be generated by concatenating multiple bucketized values, so that each bucketized value can be extracted from the combined bucketized value by implementing a specific set of bitwise operations.

A "segment" can be a subset of data. The data making up a segment can be associated with one or more common criteria (e.g., above or below a threshold value, collected within a time range, etc.). In some embodiments, the segment can comprise a subset of records in a database.

A "server computer" can be a powerful computer or a cluster of computers. For example, the server computer can be a large mainframe, a minicomputer cluster, or a group of servers functioning as a unit. In one example, the server computer may be a database server coupled to a Web server.

Exemplary systems according to some embodiments of the invention are shown in FIG. 1 through FIG. 5. While various components included in these figures are shown to be separate entities, embodiments are not so limited. For example, any of the components can be part of a single computer or may be operated by a common entity. Additionally, any of the components shown can be split into sub-systems.

FIG. 1 shows an exemplary system 100 according to some embodiments of the invention. FIG. 1 includes a raw data source device 102 that can communicate raw data to data normalization server 104, which can then communicate with a service provider computer 106. Service provider computer 106 may comprise a behavior service 108 and a predictive service 110 and may be in communication with one or more databases, including a segmentation database 118 and configuration database 120. FIG. 1 also includes a query server 112 that can retrieve data from segmentation database 118 and configuration database 120, as well as a delivery service server 114 in communication with segmentation database 118. Query server 112 and delivery service server 114 may be in communication with an application server 116.

Each of the computers shown in FIG. 1 (e.g., raw data source device 102, data normalization server 104, service provider computer 106, query server 112, delivery service server 114, and application server 116) may also be known as a computing device. A computing device can include a processor, memory, input devices, and output devices, operatively coupled to the processor. The computing device may comprise a computer-readable medium coupled to the processor. The computer-readable medium may comprise instructions, that when executed by the processor, can perform methods described herein. A computing device may be capable of communicating with other device, computers, or systems over a suitable communications network.

Exemplary computing devices include cellular or mobile phones, tablet computers, desktop computers, personal digital assistants (PDAs), pagers, portable computers, server computers, and the like. Additional computing devices may include wearable devices, such as smart watches, glasses fitness bands, ankle bracelets, rings, earrings, etc. In some embodiments, the computing device may include automobiles with remote communication capabilities.

Raw data source device 102 may be a computing device that collects raw data. Raw data may be data that is in its original form without modifications to its volume, format, or values. In some embodiments, raw data source device 102 may comprise a network interface that enables it to communicate with and collect raw data from one or more computing devices. In an exemplary case, raw data source device 102 may collect location data from a plurality of mobile devices (e.g., vehicles, mobile phones, wearable devices, etc.) equipped with GPS functionalities, each of which may have travelled corresponding to the location data. In another exemplary case, raw data source device 102 may collect transaction data from a plurality of point-of-sale terminal devices, each of which may have conducted transactions corresponding to the transaction data.

Data normalization server 104 may be a computing device that can extract data from the raw data collected by raw data source device 102. Data normalization server 104 may store filtering logic that enables extraction of appropriate data. Data normalization server 104 can extract select portions from the raw data, such as values corresponding to certain data fields. In some embodiments, data normalization server 104 may generate datasets (e.g., transaction dataset, profile dataset, etc.) including the data that it extracted.

Service provider computer 106 may be a computing device that comprises modules that provide services. Service provider computer 106 may include behavior service 108 and predictive service 110. While not shown in FIG. 1, in some embodiments, service provider computer 106 may also provide the functionalities of one or more of raw data source device 102, data normalization server 104, query server 112, delivery service server 114, and application server 116.

Behavior service 108 may be a module that can analyze, in conjunction with the processor of service provider computer 106, data to determine information about behavior that has already occurred. In some embodiments, behavior service 108 may receive raw data collected by raw data source device 102 or extracted by data normalization server 104. In some cases, behavior service 108 may receive a request for information indicating behavior that is of interest to an end user. Behavior service 108 may then determine if the requested behavior exists in the received raw data. In some implementations, behavior service 108 may process the raw data by retrieving relevant records from the raw data, aggregating information based on the raw data, or perform computation based on the raw data. In some embodiments, behavior service 108 may be implemented by a computing device that is operated by service provider computer 106.

Predictive service 110 may be a module that can analyze, in conjunction with the processor of service provider computer 106, data to determine information about the predicted propensity for certain behavior to occur in the future. In some cases, predictive service 110 can receive a dataset that includes training data. The training data may be any previously collected data. Predictive service 110 can provide the training data to a training model, which may be operated by predictive service 110.

The training model can analyze the training data to determine predictions related to potential relationships among certain properties. For example, the training model may determine a number of properties (labels) that are likely to occur based on other properties (features) that have occurred in the dataset. In some cases, the training model may indicate a number of feature and label pairs, where each feature and label pair is associated with a probability that indicates the likelihood that the label will occur given that the feature has occurred.

Predictive service 110 can output a set of predicted labels associated with an entity based on information learned by the training model. For example, based on analyzing a dataset including data associated with the entity, predictive service 110 can determine features in the dataset and then provide predictions of labels that are likely to occur based on the training model. In some embodiments, predictive service 110 may be implemented by a computing device that is operated by service provider computer 106.

Query server 112 may be a computing device that can process queries and output data based on the queries. Query server 112 can receive information related to queries for a requested segment from application server 116. Based on the received queries, query server 112 may communicate with service provider computer 106 to retrieve information associated with a relevant segment of and provide the information to application server 116.

Delivery service server 114 may be a computing device that enables delivery of information associated with segments. Delivery service server 114 can receive a delivery definition from application server 116. Based on the delivery definition, delivery service server 114 may provide a segment definition to segmentation database 118 to request a segment. Delivery service server 114 may receive the segment from segmentation database 118 and execute delivery of the segment. In some embodiments, delivery service server 114 may process (e.g., anonymize, prune, etc.) the segment before delivering it to an entity. Deliver/service server 114 may then determine the entity to which the segment should be routed, as well as the appropriate method of delivery. In some cases, delivery service server 114 may also track timing of deliveries, such as the time by which the delivery should be made and whether deliveries were made on time. In an exemplary case, delivery service server 114 may electronically send information associated with a segment, such as predicted travel routes for a group of vehicles, to a transportation authority that may want to determine traffic in a certain region.

Application server 116 may be a computing device that enables an application that can be utilized by a user. Application server 116 can provide end users and administrators the ability to register and initialize an application on their devices. In some embodiments, the application provided by application server 116 may include an interactive user interface that enables users to manage segment definitions and delivery definitions. For example, users may create segment definitions, update existing segment definitions, and schedule deliveries of segments using the application. Some exemplary user interfaces that can be provided by application server 116 are shown with respect to FIG. 12 to FIG. 16.

Segmentation database 118 may store information related to segments. Segmentation database 118 may comprise data received from behavior service 108 and predictive service 110. In some embodiments, the data may comprise columns of data extracted from data processed by behavior service 108 or predictive service 110, along with segment definition information (e.g., segment name, time created, relevant entity name, filter criteria, etc.). The segment definitions may be predetermined or defined during execution by a user. In some embodiments, segmentation database 118 may store data related to specific segments in electronic files.

Configuration database 120 may store information utilized for configuration processes. Configuration information may comprise information that can be utilized to process queries to behavior service 108 or predictive service 110. For example, configuration database 120 may include a column name to identifier mapping that indicates the identifiers and names (e.g., application id, dimension id, field name, field id, etc.) that can be, included in a query to request loading of associated values. Configuration database 120 may also include transformation information (e.g., number of buckets, aggregation methods, etc.) that can be included in a query to request processing of data in an appropriate manner. Configuration database 120 may also include information indicating the different types of dimensions or other configurable fields that can be displayed by the user interface (e.g., in pull-down lists, etc.) provided by application server 116 and the different datasets available to be analyzed.

Any of the databases described herein (e.g., segmentation database 118, configuration database 120) may be a conventional, fault tolerant, relational, scalable, secure database such as those commercially available from Oracle™ or Sybase™. In some embodiments, any of the databases may be combined into a single database, or may be separated into multiple databases. In some embodiments, any of the databases may reside at a computer shown in FIG. 1, such as service provider computer 106 or query server 112.

Figure 2:
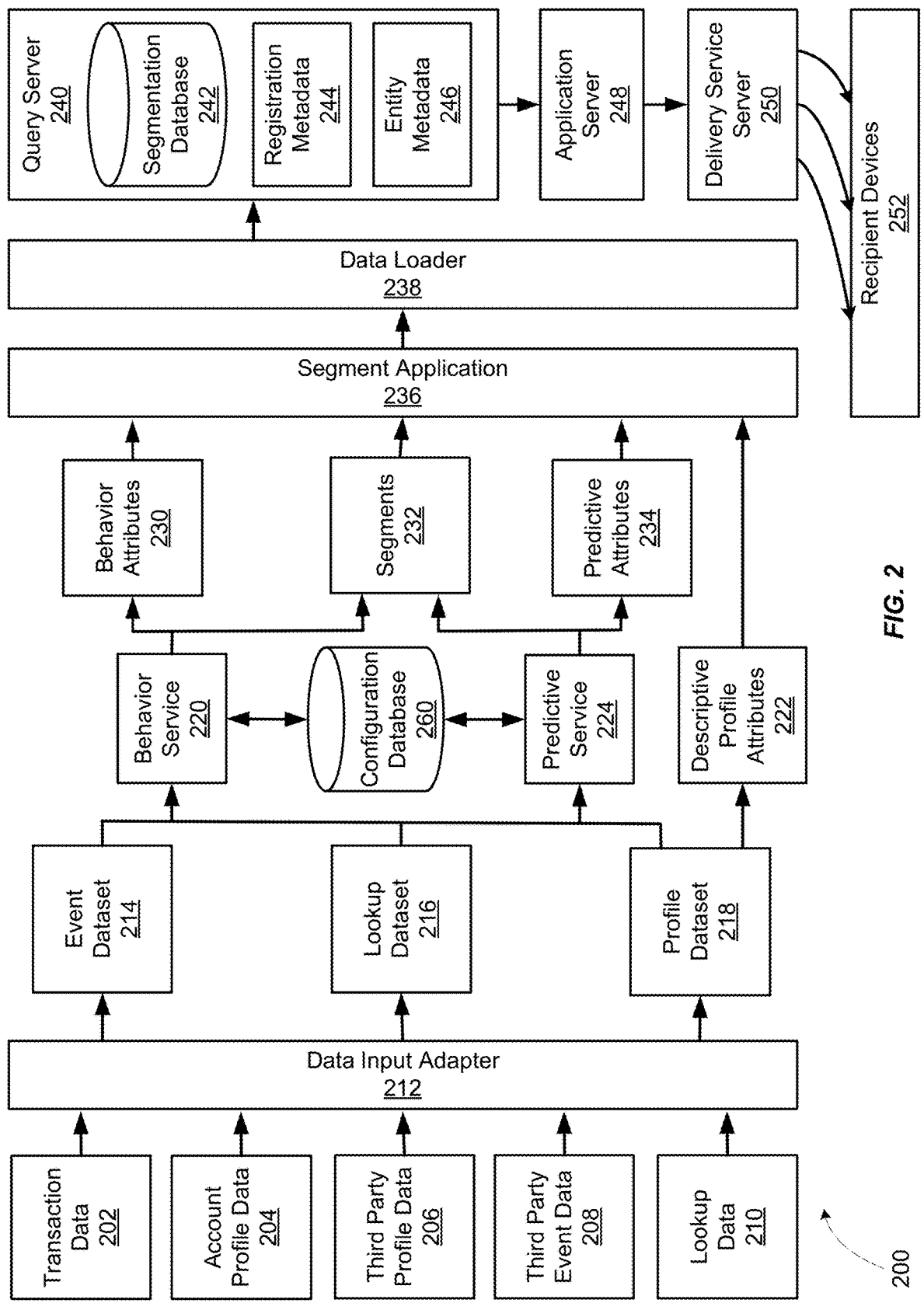
FIG. 2 shows an exemplary data flow according to some embodiments of the invention.
Figure 3:
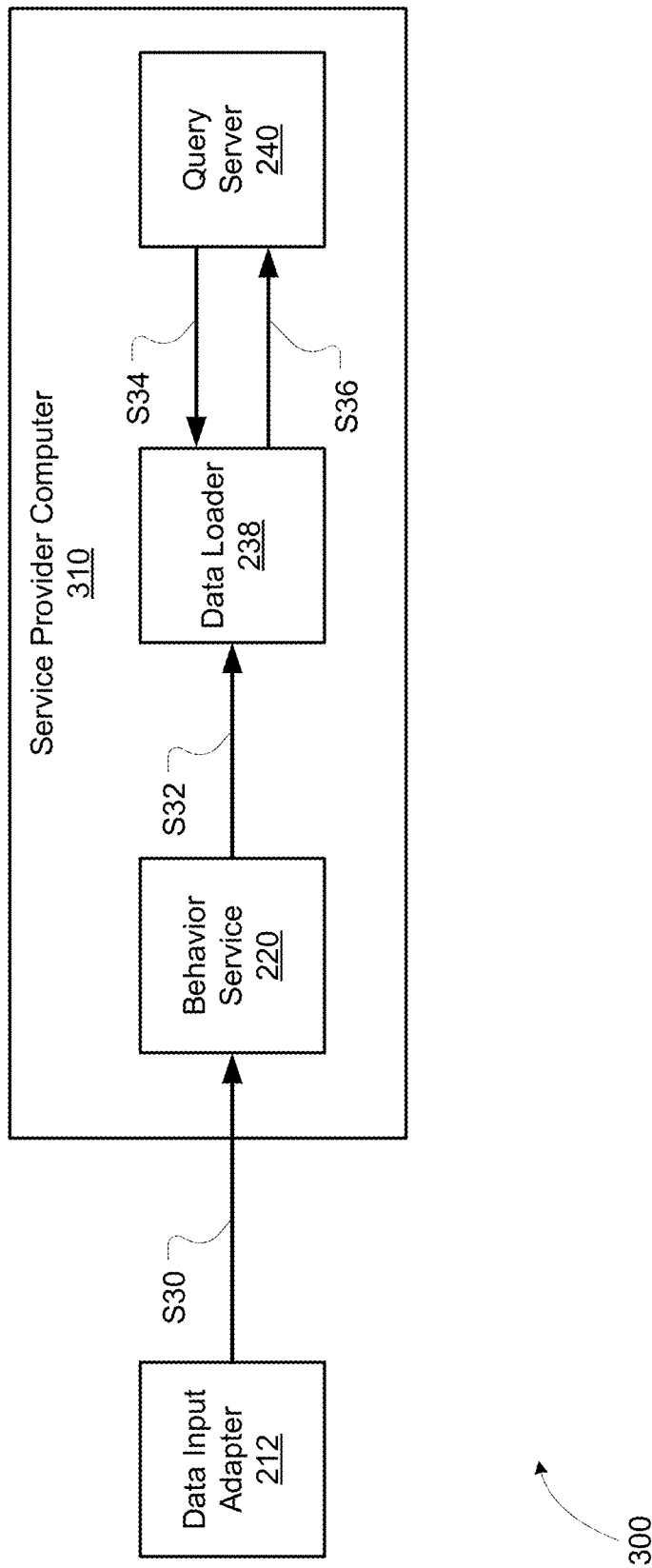
FIG. 3 shows an exemplary system providing a behavior service according to some embodiments of the invention.
Figure 4:
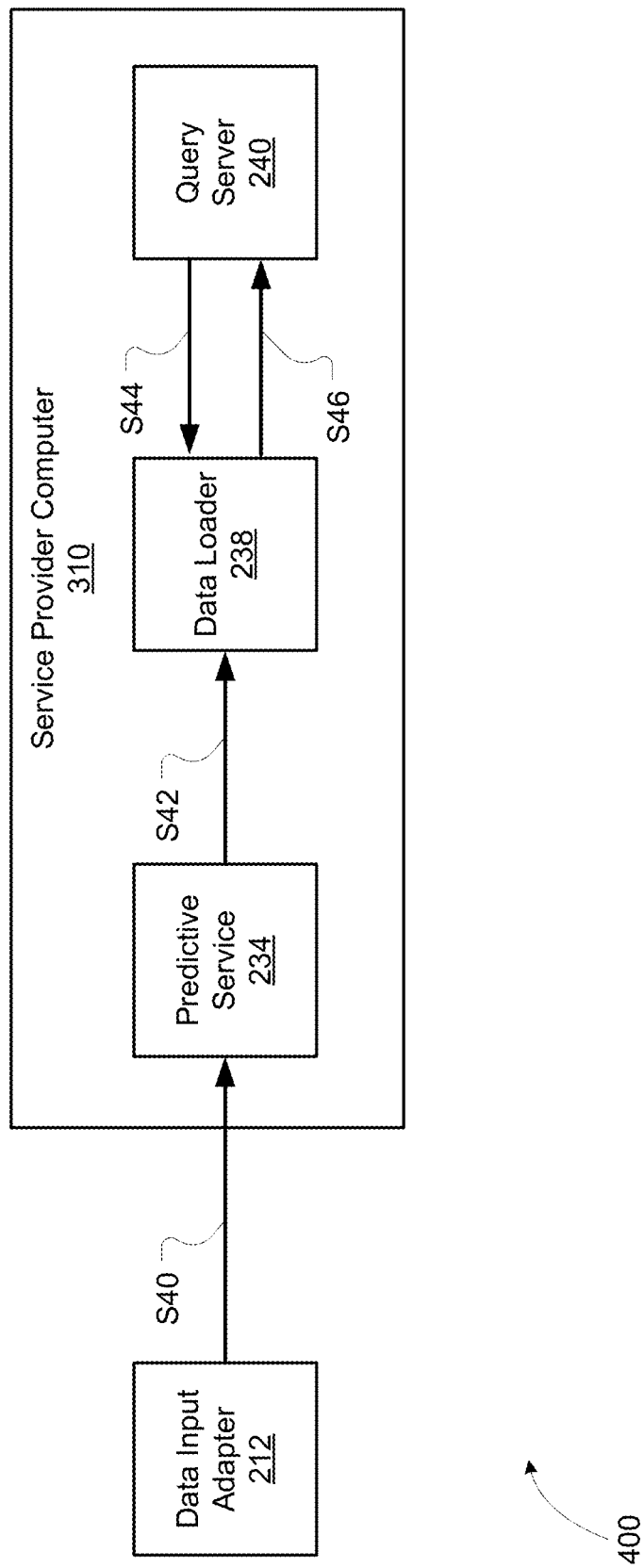
FIG. 4 shows an exemplary system providing a predictive service according to some embodiments of the invention.
Figure 5:
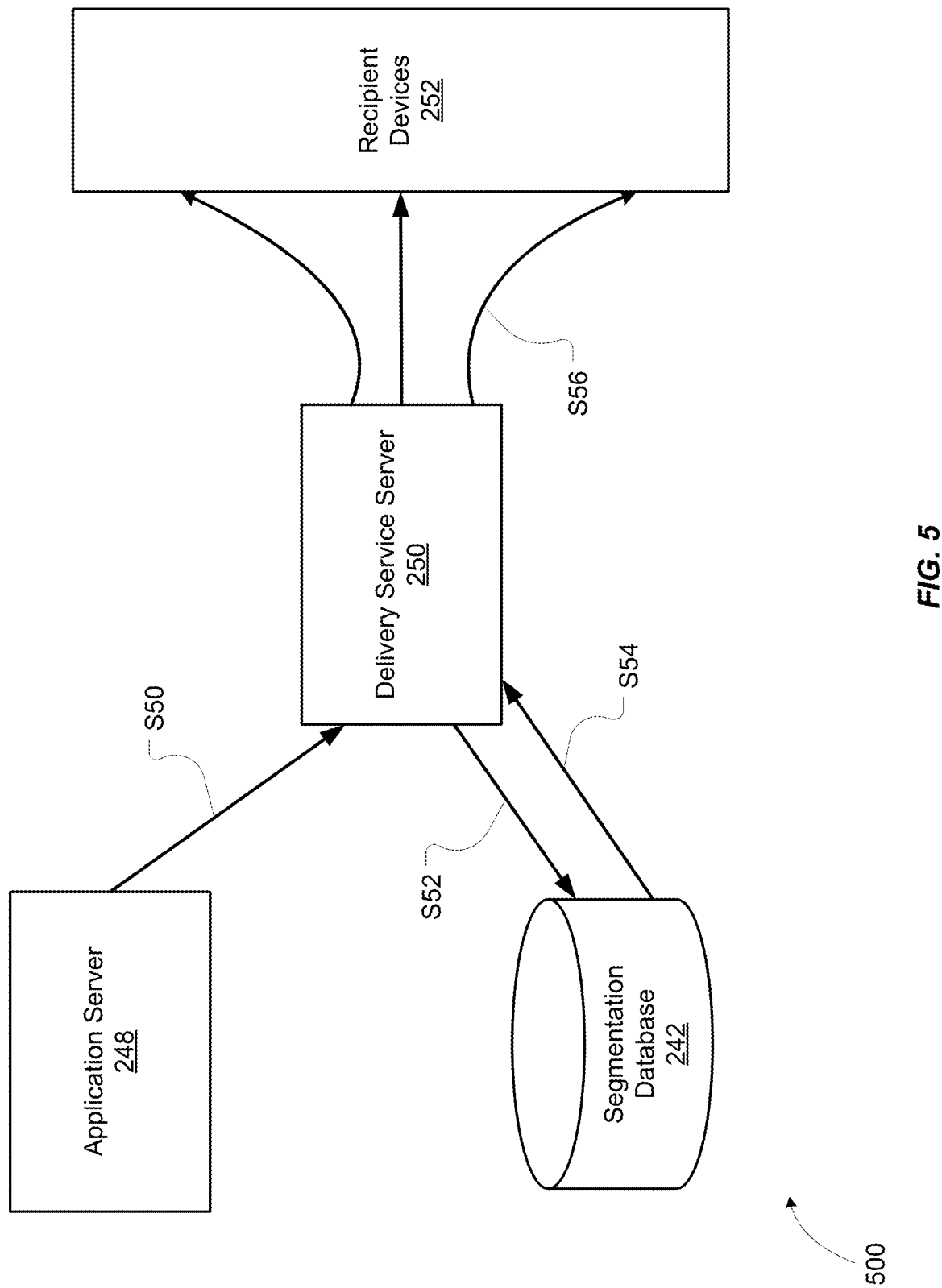
FIG. 5 shows an exemplary system providing a delivery service according to some embodiments of the invention.

FIG. 2 shows an exemplary data flow 200 according to some embodiments of the invention. FIG. 2 shows components including a data input adapter 212, a segment application 236, a data loader 238, a query server 240, an application server 248, a delivery service server 250, recipient devices 252, as well as certain data that is communicated amongst the components. FIG. 2 is not meant to be limiting, as some components are not shown for simplicity (e.g., behavior service 220 and predictive service 224 may reside in a service provider computer) and some components can be combined. Some steps are described with respect to components of FIG. 1, as well as steps shown in the simplified flows 300 of FIG. 3, 400 of FIG. 4, and 500 of FIG. 5. In some embodiments, some steps of flow 300 and 400 may be performed by a service provider computer 310, which may have similar characteristics to that described for service provider computer 106 of FIG. 1.

Initially, raw data is collected from a source system. The source system can include one or more devices with characteristics similar to those of raw data source device 102. In some embodiments, the raw data can include transaction data 202, account profile data 204, third party profile data 206, third party event data 208, and lookup data 210. The raw data can be sent to data input adapter 212 continuously or periodically.

Data input adapter 212 may process raw data so that it is in appropriate form to be processed by behavior service 220 and predictive service 224. In some embodiments, data input adapter 212 may comprise the functionality of data normalization server 104. Data input adapter 212 may be capable of extracting data from the source system using filtering logic and metadata. In some embodiments, data input adapter 212 may generate datasets based on extracted data. For example, data input adapter 212 may generate a transaction/event dataset 214, a lookup dataset 216, and a profile dataset 218 and send the generated datasets to behavior service 220 (Step S30 of FIG. 3) and predictive service 224 (Step S40 of FIG. 4). Behavior service 220 may comprise characteristics similar to those described for behavior service 108, as well as with respect to other figures included herein. Predictive service 224 may comprise characteristics similar to those described for predictive service 110, as well as with respect to other figures included herein.

Behavior service 220 may determine behavior attributes 230 based on datasets received from data input adapter 212 and information in configuration database 260. Behavior attributes 230 may include metadata corresponding to queries for segments processed by behavior service 220. For example, behavior attributes 230 may indicate behavior dimensions and events by which data can be segmented. Some exemplary dimensions include a frequency, a category code, a name, and a geolocation range. An event may include any occurrence (e.g., action) associated with an entity, where the occurrence can be characterized by a metric associated with a dimension. In some embodiments, behavior service 220 may determine behavior attributes 230 based on a query received from a user. In other embodiments, behavior attributes 230 can be predetermined.

Behavior service 220 may process datasets received from data input adapter 212 and information in configuration database 260 to determine segments included in segments 232. The segments output by behavior service 220 may each correspond to one or more attributes of behavior attributes 230. In some embodiments, behavior service 220 may determine the segments by aggregating data or otherwise performing any suitable computations on data in the dataset. An exemplary method of outputting a behavior segment is described in more detail with respect to FIG. 3.

Predictive service 224 may determine predictive attributes 234 datasets received from data input adapter 212 and information in configuration database 260. Predictive attributes 234 may include metadata corresponding to queries for segments processed by predictive service 224. For example, predictive attributes 234 may indicate predictive dimensions or events by which data can be segmented. Some exemplary dimensions include predicted repeat use, predicted repeat visit, predicted speed, and a predicted spend amount. An event may include any occurrence (e.g., action) that can be characterized by a metric associated with a dimension.

Predictive service 224 may process datasets received from data input adapter 212 and information in configuration database 260 to determine segments included in segments 232. In some embodiments, predictive service 224 may determine the segments based on a training model that indicates predictions related to potential relationships among properties of a dataset. The segments output by predictive service 224 may each correspond to one or more attributes of predictive attributes 234. In some embodiments, predictive service 224 may augment data that is output by behavior service 220 with predictive data, which may be in the form of one or more predictive columns. An exemplary method of outputting a predictive segment is described in more detail with respect to FIG. 4.

Segment application 236 may receive behavior attributes 230, segments 232, and predictive attributes 234 from behavior service 220 and predictive service 224, as well as descriptive profile attributes 222. Segment application 236 may include modules that enable, in conjunction with a data processor, processing of behavior attributes 230, segments 232, predictive attributes 234, and descriptive profile attributes 222 to generate segment definitions that are to be added to segmentation database 242. Segment application 236 may provide the segment definitions to data loader 238. In some embodiments, segment application 236 may run on a computing device operated by a user.

Data loader 238 may load data associated with segment definitions received from segment application 236 into segmentation database 242. In some embodiments, data loader 238 may obtain data determined by behavior service 220 (Step S32 of FIG. 3) and predictive service 224 (Step S42 of FIG. 4) and add some or all of the data to segmentation database 242 based on the received segment definitions. For example, for a segment definition indicating a use for only a subset of behavioral or predictive columns, data loader 238 may generate separate files including just the subset of behavioral or predictive columns and upload it to segmentation database 242. Data loader 238 may also be capable of loading metadata, such as registration metadata 244 and entity metadata 246, and sending information to query server 240 regarding how to interpret (e.g., parse) the metadata.

Query server 240 may provide information associated with segments requested by a user to application server 248. Query server 240 may receive a query indicating a segment definition generated by segment application 236 and may then determine information associated with the segment from segmentation database 242 based on the criteria indicated in the query. Query server 240 may also store registration metadata 244, which may comprise enrollment information from registration processes conducted by users utilizing applications (e.g., segment application 236) hosted by application server 248. Query server 240 may also store entity metadata 246, which may comprise information (e.g., identification information) related to the entities associated with the segments being analyzed by segment application 236, which can also be utilized by query server 240 to locate information related to the entities stored in segmentation database 242.

In some embodiments, query server 240 may communicate with data loader 238 to retrieve information associated with segments. For example, query server 240 may forward a received query for a segment corresponding to behavior and/or predictive attributes to data loader 238 (Step S34 of FIG. 3 and Step S44 of FIG. 4), which may then provide information to query server 240 indicating the location of information associated with the segment in segmentation database 242 (Step S36 of FIG. 3 and Step S46 of FIG. 4).

Application server 248 may receive information associated with a segment stored in segmentation database 242 from query server 240 and enable further processing of the information. For example, application server 248 may enable the information to be displayed in various formats (e.g., graphs, charts, tables, etc.) to segment application 236 for review. In some embodiments, application server 248 can process instructions from segment application 236 related to saving information related to a segment or sending some of the information, such as a segment definition, to another entity utilizing delivery service server 250.

Delivery service server 250 may receive information associated with a segment, as well as instructions from application server 248 (Step S50 of FIG. 5) to send the information associated with a segment to a certain destination. In some embodiments, delivery service server 250 may information associated with the delivery process, such as recipient identification information (e.g., recipient name, recipient location, etc.), method of delivery (e.g., email, text, etc.), and destination information (e.g., email address, phone number, etc.). In some embodiments, delivery service server 250 may receive a segment definition from application server 248. In response, delivery service server 250 may send the segment definition to segmentation database 242 (Step S52 of FIG. 5) and receive back information associated with the segment from segmentation database 242 (Step S54 of FIG. 5). Delivery service server 250 may then send the information associated with the segment to recipient devices 252 (Step S56 of FIG. 5) in any suitable format (e.g., electronic files).

Recipient devices 252 may include any suitable computing devices that can be operated by recipients indicated by delivery service server 250. Recipient devices 252 may be capable of receiving and processing information associated with segments from delivery service server 250. In some embodiments, recipient devices 252 may process the information received from delivery service server 250 and perform further actions based on the information. For example, a recipient associated with a recipient device may review travel route information related to a segment of vehicles in order to determine an appropriate action to take to alleviate traffic congestion in a certain region. The recipient may then use their recipient device to provide a discounted toll fee or send suggestions for alternative routes to drivers associated with the vehicles identified in the segment of vehicles. In some cases, the actions that can be performed by recipient devices 252 may also be performed by the delivery service server 250.

Figure 6:
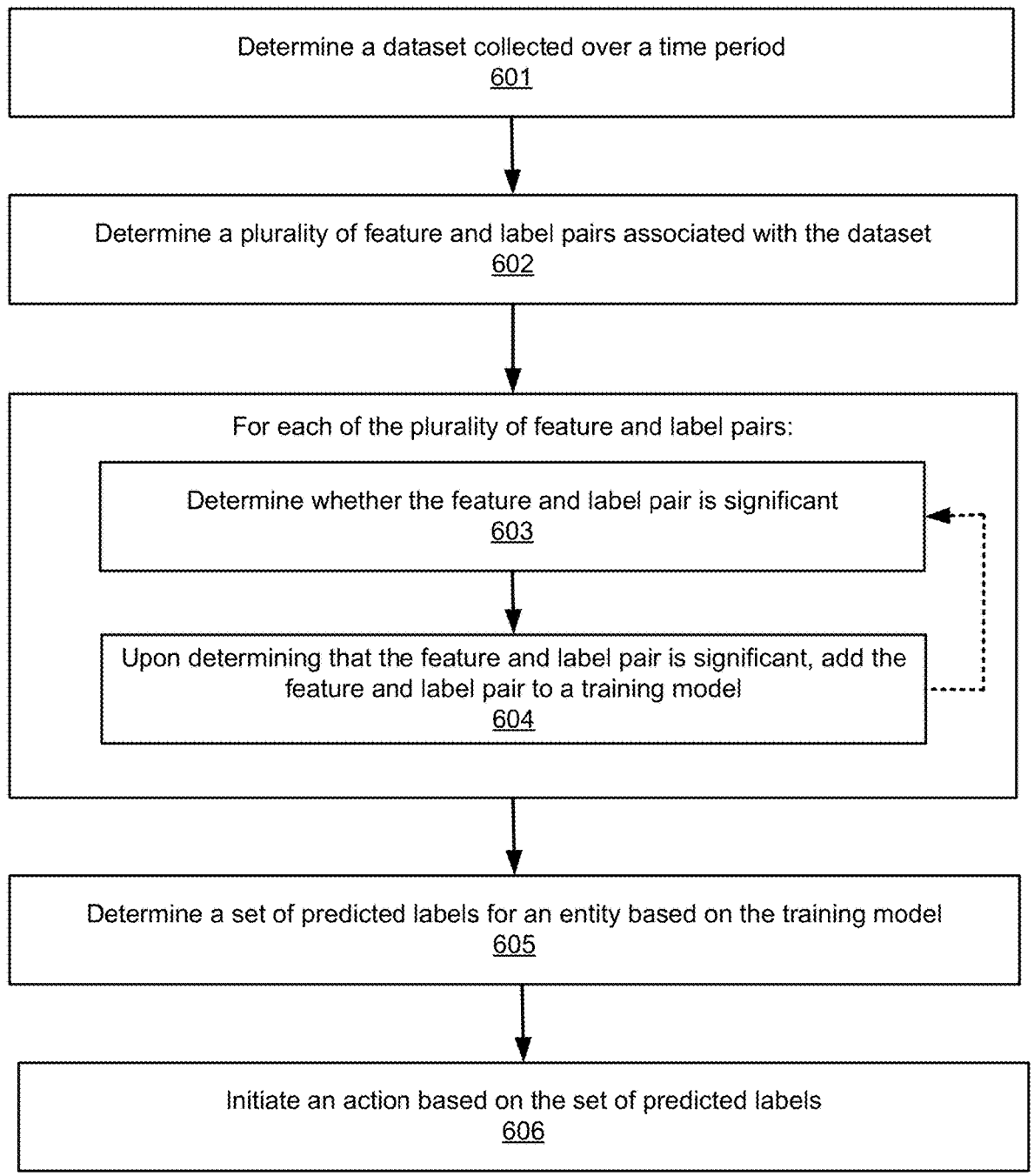
FIG. 6 shows an exemplary method for determining predictive data according to some embodiments of the invention.

FIG. 6 shows an exemplary method 600 according to some embodiments of the invention. Method 600 may be performed by a server computer (e.g., service provider computer including behavior service and predictive service) and may be utilized to predict future behavior associated with an entity. It is understood that additional methods and processes may be included within these methods and may be recognized by one of ordinary skill in the art, in light of the description below. Further, in some embodiments of the present invention, the described methods may be combined, mixed, and matched, as one of ordinary skill would recognize.

At step 601, the server computer may determine a dataset collected over a time period. The time period over which the dataset spans may be predetermined by the server computer, or may be specified by a user. In some embodiments, the dataset may comprise data field values as well as metadata (e.g., data field names, etc.) for events occurring over the time period.

Figure 7:
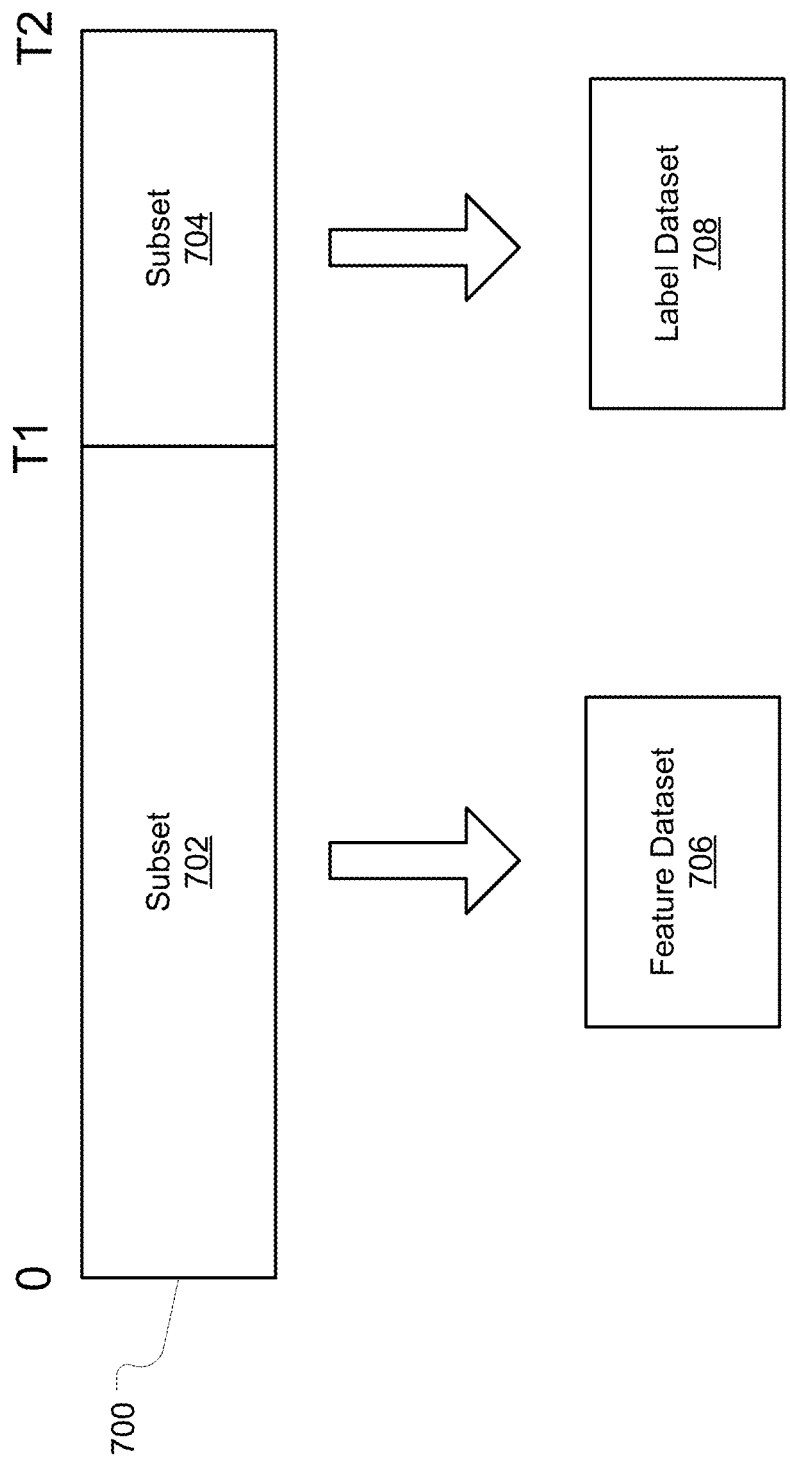
FIG. 7 shows an exemplary dataset according to some embodiments of the invention.

An exemplary dataset 700 is shown in FIG. 7. Dataset 700 spans over a time period spanning over time 0 to time T2. In this exemplary case, dataset 700 may be a transaction dataset that comprises data field values as well as metadata (e.g., data field names, etc.) for transactions conducted over the time period spanning over time 0 to time T2. For example, dataset 700 may include columns of data corresponding to the data fields of account identifier (e.g., account number), transaction timestamp, resource provider name, and resource provider category. The entity for which the future behavior is being predicted in this case may be an account user associated with an account identifier.

Referring back to FIG. 6, at step 602, the server computer may determine a plurality of feature and label pairs associated with the dataset. The server computer may first determine a first subset from the dataset and a second subset from the dataset, where the first subset can correspond to data collected at an earlier time within the time period than that of the data corresponding to the second subset. The server computer may then extract features from the first subset to obtain a feature dataset and extract labels from the second subset to obtain a label dataset. The server computer may determine the plurality of feature and label pairs based on the extracted data.

Step 602 is described with respect to FIG. 7. The server computer may determine a subset 702 as data in dataset 700 corresponding to the time period spanning over time 0 to time T1. The server computer may also determine a subset 704 as data in dataset 700 corresponding to the time period spanning over time T1 to time T2. Time T1 may be a point within the time period spanning over time 0 to time T2, such that T1 occurs after time 0 and before time T2.

After determining subsets 702 and 704, the server computer may determine the feature and label types that are to be analyzed. For example, the server computer may determine (e.g., based on user request) to generate a training model that can determine a Feature→Label relationship in the form of Resource Provider Name→Resource Provider Category. The training model may thus be configured to predict the resource provider categories of resource providers with which an entity is likely to conduct future transactions, given the resource provider names of the resource providers with which the entity has conducted transactions in the past.

The server computer may then determine feature dataset 706 based on subset 702. In some embodiments, the server computer may extract all values of the feature being analyzed for the training model from subset 702. Since the relationship being analyzed is Resource Provider Name→Resource Provider Category, the server computer may extract all resource provider names occurring in subset 702 for each account. Thus, feature dataset 706 may comprise a column of account identifiers and a column of corresponding resource provider names.

The server computer may also determine label dataset 708 based on subset 704. In some embodiments, the server computer may extract all values of the label being analyzed for the training model from subset 704. Since the relationship being analyzed is Resource Provider Name→Resource Provider Category, the server computer may extract all resource provider categories occurring in subset 704 for each account. Thus, feature dataset 708 may comprise a column of account identifiers and a column of corresponding resource provider categories.

The server computer may now determine feature and label pairs associated with dataset 700 by determining feature and label pairs that co-occur based on feature dataset 706. One way that the server computer can accomplish this is by joining feature dataset 706 and label dataset 708 based on a common data field value. For example, the server computer may perform an inner join on feature dataset 706 and label dataset 708 based on a join-predicate that specifies that the account identifier in feature dataset 706 should equal the account identifier in label dataset 708. The result may comprise a table that includes a column of account identifiers, a column of resource provider names, and a column of resource provider categories, wherein each row of data may comprise an account identifier, a resource provider name, and a resource provider category. The information in each row may indicate an account identifier that is associated with an entity that conducted a transaction at a resource provider corresponding to the resource provider name sometime between time 0 to time T1, and also conducted a transaction at a resource provider corresponding to the resource provider category sometime between time T1 to time T2. Hence, a resource provider name and resource provider category in the same row can make up a feature and label pair indicating the relationship Resource Provider Name→Resource Provider Category. The server computer may determine the plurality of feature and label pairs based on the information stored in the joined table.

It is understood that other information may be included in the table. Any suitable information that can be determined based on the dataset collected in step 601 can be included in the table. For example, in addition to the column of account identifiers, the column of resource provider names, and the column of resource provider categories, the table can include a column of recent timestamps and a column of frequencies. In this case, each row of data may comprise an account identifier, a resource provider name, a resource provider category, a recent timestamp, and a frequency. The recent timestamp may indicate the most recent timestamp at which the account identifier in the corresponding row was utilized to conduct a transaction at the resource provider corresponding to the resource provider name in the corresponding row. The frequency may indicate the number of times that the account identifier in the corresponding row has conducted transactions at the resource provider corresponding to the resource provider name, in the corresponding row. Other types of information may be determined and included in a table as recognized as one of ordinary skill in the art.

Steps 603 and 604 may be performed for each of the plurality of feature and label pairs determined in step 602. At step 603, the server computer may determine whether a feature and label pair is significant. At step 604, upon determining that the feature and label pair is significant, the server computer may add the feature and label pair to a training model. Adding the feature and label pair to the training model may indicate that there is a likelihood that there is a meaningful relationship between the occurrence of the corresponding feature and the label in a dataset. As described above, a training model can be any suitable computational model that indicates information related to predictive relationships.

Figure 8:
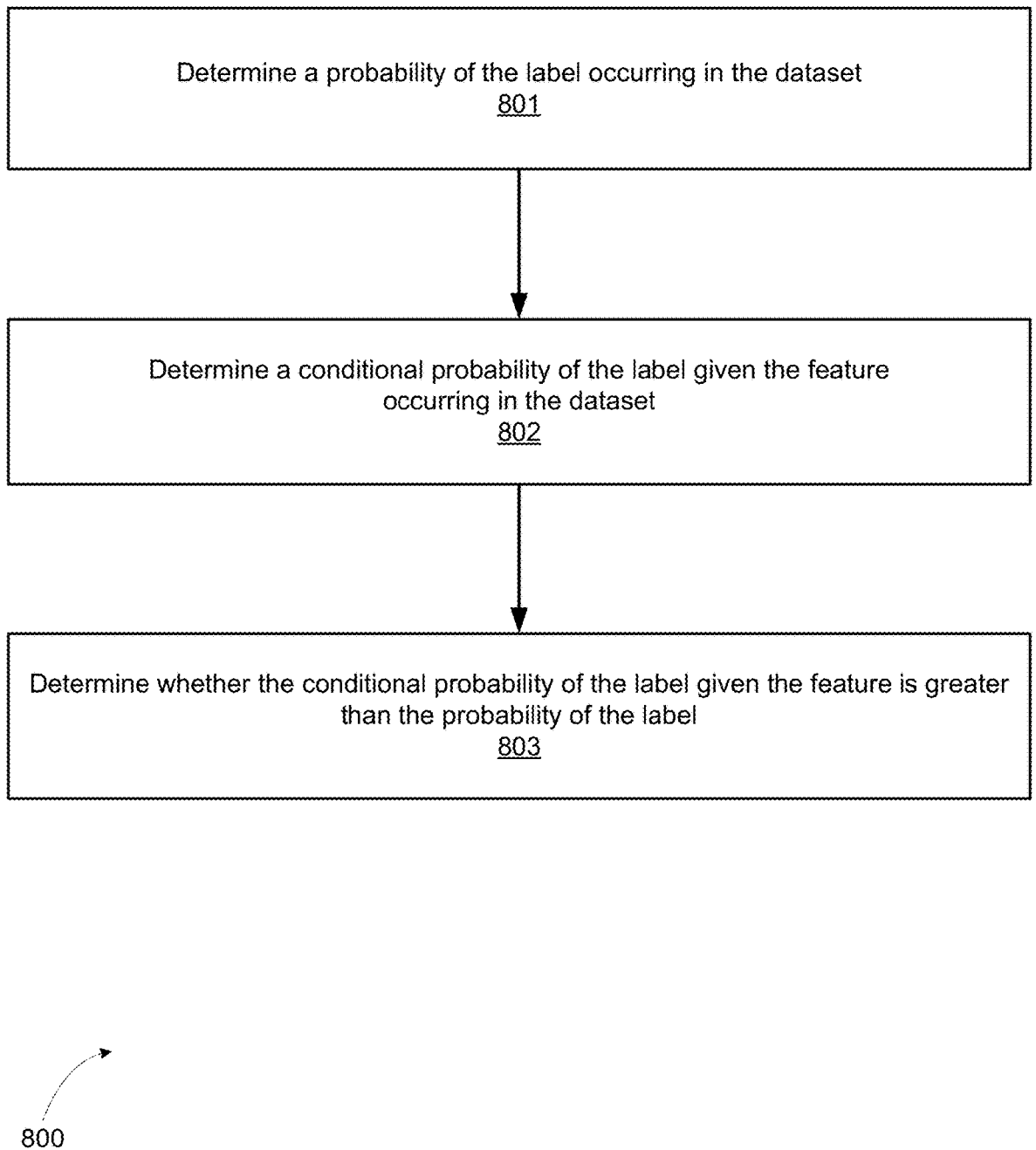
FIG. 8 shows an exemplary method for determining whether a feature and label pair is significant according to some embodiments of the invention.
Figure 9:
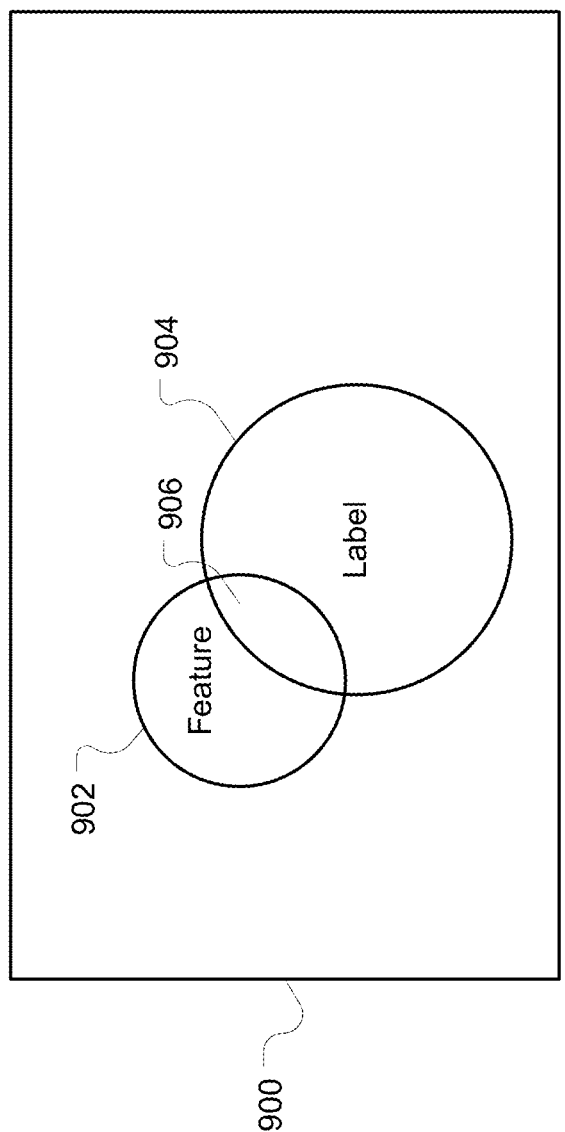
FIG. 9 shows an exemplary probability diagram according to some embodiments of the invention.

An exemplary process for performing step 603 is described in further detail with respect to FIG. 8 and FIG. 9. In some embodiments, steps 801-803 can be performed to determine whether the feature and label pair, including a feature and a label, is significant. Some of the steps in exemplary flow 800 of FIG. 8 are described with respect to the exemplary case in which the feature and label pair may follow the relationship indicated by Resource Provider Name→Resource Provider Category, where the feature may be resource provider name A and the label may be resource provider category B. The dataset referred to in steps 801-803 may be similar to dataset 700 of FIG. 7, where dataset 700 is a transaction dataset. An example of this Resource Provider Name→Resource Provider Category relationship may be McDonalds→Airline, where "McDonalds" is the feature and "Airline" is the resource provider category. The goal of analyzing this relationship can be to determine whether entities that previously conducted transactions at McDonalds are likely to conduct transactions associated with airlines in the future.

At step 801, the server computer may determine a probability of the label occurring in the dataset. In some embodiments, this probability may be expressed by the equation below, where $P(label_i)$ represents the probability of the label $label_i$ occurring in the dataset, $|entities|$ represents the total number of entities in the dataset (e.g., set 900 of FIG. 9), and $|entities_{label_i}|$ represents the number of entities in the dataset that are associated with the property $label_i$ (e.g., set 904 of FIG. 9).

$$P(label_i) = \frac{|entities_{label_i}|}{|entities|}$$

In the exemplary case in which the feature is resource provider name A and the label is resource provider category B and the dataset is a transaction dataset, the probability of the label occurring in the dataset determined in step 801 can represent the likelihood that an entity conducted a transaction associated with the label resource provider category B out of all entities. For example, the equation for $P(label_i)$ may be rewritten as shown below, where $P(label_{category=B})$ represents the probability of the label of resource provider category B occurring in the dataset, $|accounts_{category=B}|$ represents the total number of unique accounts that conducted a transaction associated with resource provider category B in the dataset, and $|accounts|$ represents the total number of accounts in the dataset.

$$P(label_{category=B}) = \frac{|accounts_{category=B}|}{|accounts|}$$

At step 802, the server computer may determine a conditional probability of the label given the feature occurring in the dataset. In some embodiments, this conditional probability may be expressed by the equation below, where $P(label_i|feature_j)$ represents the conditional probability of the label $label_i$ given the feature $feature_j$ occurring in the dataset.

$$P(label_i \mid feature_j) = \frac{P(label_i \& feature_j)}{P(feature_j)}$$

The value $P(label_i \& feature_j)$ represents the probability of both label $label_i$ and feature $feature_j$ occurring for the same entity in the dataset. In some embodiments, this probability may be further represented by the equation below where $|entities|$ represents the total number of entities in the dataset (e.g., set 900 of FIG. 9) and $|entities_{(label_i \& feature_j)}|$ represents the total number of entities in the dataset that are associated with both the properties $label_i$ and $feature_j$ (e.g., set 906 of FIG. 9).

$$P(label_i \& feature_j) = \frac{|entities_{(label_i \& feature_j)}|}{|entities|}$$

The value $P(feature_j)$ represents the probability of the feature $feature_j$ occurring in the dataset. In some embodiments, this probability may be further represented by the equation below, where $|entities|$ represents the total number of entities in the dataset (e.g., set 900 of FIG. 9), and $|entities_{feature_j}|$ represents the number of entities in the dataset that are associated with the property $feature_j$ (e.g., set 902 of FIG. 9).

$$P(feature_j) = \frac{|entities_{feature_j}|}{|entities|}$$

In the exemplary case in which the feature is resource provider name A and the label is resource provider category B and the dataset is a transaction dataset, the conditional probability of the label given the feature occurring in the dataset determined in step 802 can represent the likelihood of an entity associated with the label resource provider category B occurring given the entities associated with the feature resource provider name A. For example, the equation for P(label$_i$|feature$_j$) may be rewritten as shown below, where P(label$_{category=B}$|feature$_{name=A}$) represents the probability of the label of resource provider category B occurring in the dataset given the feature of resource provider name A, |accounts$_{(category=B\ \&\ name=A)}$| represents the total number of unique accounts that conducted a transaction associated with resource provider category B and resource provider name A in the dataset, and |accounts| represents the total number of accounts in the dataset.

$$P(label_{category=B} \mid feature_{name=A}) = \frac{|accounts_{(category=B\&name=A)}|}{|accounts|}$$

At step 803, the server computer may determine whether the conditional probability of the label given the feature is greater than the probability of the label. The server computer may thus compare the determined values of P(label$_i$) determined in step 801 and P(label$_i$|feature$_j$) determined in step 802. In some implementations, if the server computer determines that the value of P(label$_i$|feature$_j$) is greater than the value of P(label$_i$), this may indicate that the corresponding feature and label pair can be considered significant. Accordingly, in some implementations, if the server computer determines that the value of P(label$_i$|feature$_j$) is less than or equal to the value of P(label$_i$), this may indicate that the corresponding feature and label pair cannot be considered significant.

While an exemplary methodology in which the significance of the feature and label pair is determined based on the determining whether P(label$_i$|feature$_j$)>P(label$_i$) is described above, embodiments are not so limiting. For example, other suitable computations can be utilized instead that may utilize one or more of the value of P(label$_i$|feature$_j$) and the value of P(label$_i$) as parameters (e.g., P(label$_i$|feature$_j$)≥P(label$_i$), P(label$_i$|feature$_j$)>P(label$_i$)+C where C is a constant, etc.). Other implementations may comprise a methodology that does not involve use of values P(label$_i$|feature$_j$) or P(label$_i$).

The determination that the feature and label pair can be considered significant may indicate that the Feature→Label relationship in the dataset may be meaningful. In other words, this may indicate that, based on the analyzed dataset, there is a likelihood that an entity will be associated with the label in the future, given that the entity is already associated with the feature. In the exemplary case in which the feature is resource provider name A and the label is resource provider category B and the dataset is a transaction dataset, the determination that the resource provider name A→resource provider category B relationship can be considered significant may indicate that, based on the analyzed dataset, there is a likelihood that a transaction associated with resource provider category B will occur given that a transaction associated with resource provider name A has occurred. Thus, a significant feature and label pair can provide predictive information for any dataset that may comprise the feature and/or label.

Referring back to FIG. 6, at step 604, upon determining that the feature and label pair is significant, the server computer may add the feature and label pair to a training model. Adding the feature and label pair to a training model may comprise storing, by the server computer, data indicating the feature, label, and relationship between the feature and label pair (e.g., Feature→Label) in its systems. In some embodiments, any other information associated with the feature and label pair may also be stored with the data. For example, the conditional probability determined at step 802 of FIG. 8 for the feature and label pair may be stored with the data. In some embodiments, the conditional probability can serve as a metric (e.g., score) that can be utilized by the server computer to compare the feature and label pair against other feature and label pairs.

After steps 603 and 604 have been performed for each of the plurality of feature and label pairs, the training model may include any suitable number of significant feature and label pairs. In some embodiments, the training model may not recognize any significant feature and label pairs, since no significant feature and label pairs were determined in step 603. In these cases, the method may not proceed to step 605. However, if the training model already includes information regarding other significant feature and label pairs determined based on previously conducted analyses, the method may still proceed to step 605. In other embodiments, one or more significant feature and label pairs may be determined at step 603. In some cases, the one or more significant feature and label pairs determined at step 603 may be the only significant feature and label pairs recognized by the training model. In other cases, the one or more significant feature and label pairs determined at step 603 may be supplemented to the training model in addition to information regarding other significant feature and label pairs determined based on previously conducted analyses.

In some embodiments, some information stored for each of the one or more significant feature and label pairs in the training model can be bucketized. For example, the conditional probabilities corresponding to each of the one or more significant feature and label pairs can be bucketized. In some implementations, the conditional probabilities can be bucketized to deciles, where each conditional probability is assigned a value between 1 to 10 corresponding to its magnitude relative to other conditional probability values. The bucketized conditional probability can then be stored by the server computer. It is understood that any other bucketing algorithms can be utilized that enable the conditional probability values to be compared, while being categorized into groups. In some embodiments, the bucketized conditional probabilities may be combined with other bucketized values for each significant feature and label pair before being stored, which is described in more detail with respect to FIG. 11 to FIG. 12.

At step 605, the server computer may determine a set of predicted labels for an entity based on the training model. The entity may be an individual, an object, an organization, etc. As described above, a set of predicted labels can include one or more labels that are predicted to occur based on a dataset. The set of predicted labels may be determined based on the Feature→Label relationship being analyzed. While the exemplary case described for the methods shown in at least FIG. 6 utilizes only one feature variable (e.g., Feature→Label) for simplicity, embodiments are not so limited. It is understood that the methods can be modified as understood by one of ordinary skill in the art to utilize any suitable number of categorical or real features.

Figure 10:
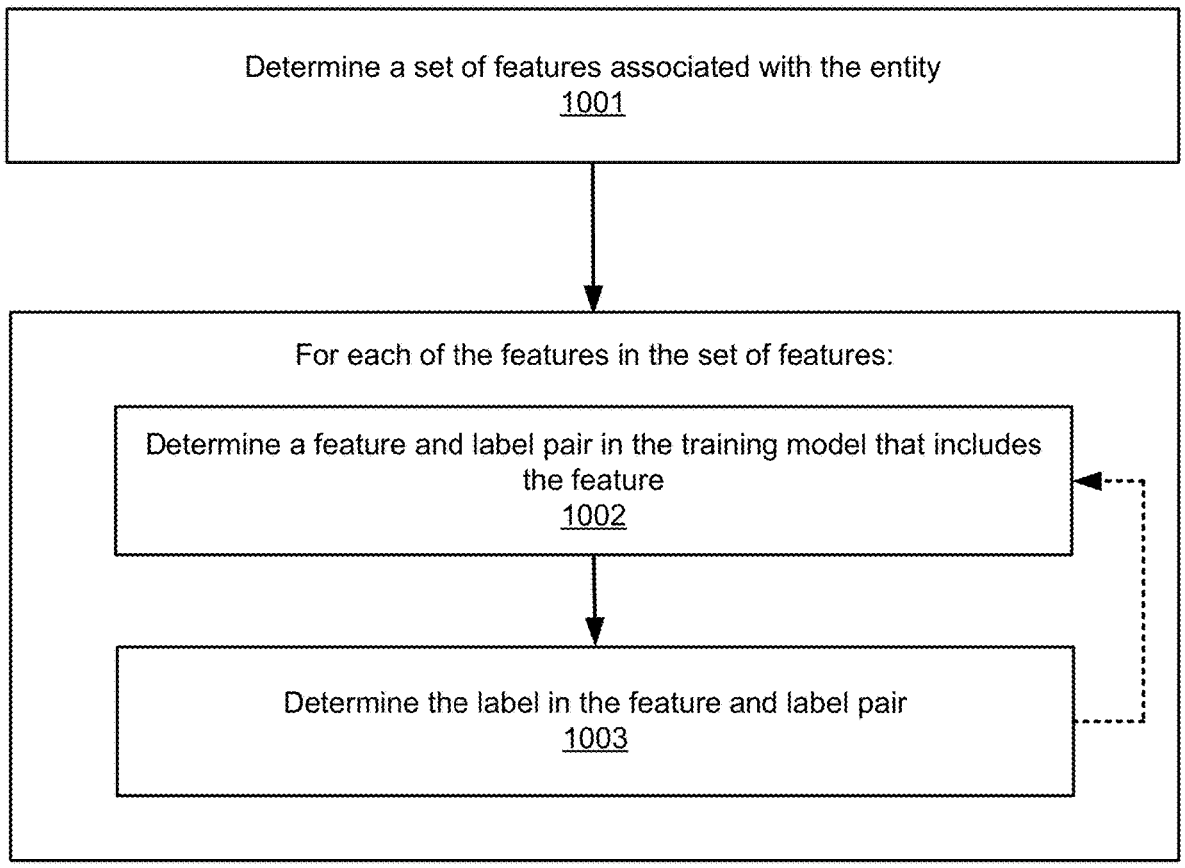
FIG. 10 shows an exemplary method for determining a set of predicted labels according to some embodiments of the invention.

An exemplary process for performing step 605 is described in further detail with respect to exemplary flow 1000 of FIG. 10. Some of the steps 1001 to 1003 in FIG. 10 are described with respect to the exemplary case in which the feature and label pair being analyzed may follow the relationship indicated by Resource Provider Name→Resource Provider Category and the dataset is a transaction dataset. In this case, the feature may be resource provider name A and the label may be resource provider category B.

At step 1001, the server computer may determine a set of features associated with the entity. The server computer may first determine (e.g., obtain) a dataset associated with the entity. The dataset may not be the same as the dataset determined at step 601. For example, the dataset determined at step 601 may include data associated with multiple entities (e.g., multiple accounts, multiple vehicles, etc.), while the dataset determined at step 1001 may be associated with the single entity (e.g., an account, a vehicle, etc.). Further, the dataset determined at step 601 and the dataset determined at step 1001 may be associated with different time periods. However, typically, the dataset determined at step 1001 may span the same length of time as that of subset 702 of FIG. 7. Looking at FIG. 7, this length may correspond to the length of time between time 0 and time T1. The server computer may then determine all of the features that occur in the dataset. The goal in steps 1002 and 1003 can then be to predict, based on the determined features, labels that may occur in a future dataset associated with the entity corresponding to the length of time between time T1 and time T2 as shown in FIG. 7.

Step 1001 is described with respect to the exemplary case in which the feature and label pair being analyzed follows the relationship indicated by Resource Provider Name→Resource Provider Category and the dataset associated with the entity (e.g., account holder) is a transaction dataset. In this case, the server computer may first determine the dataset associated with the entity and then determine all of the resource provider names that occur in the dataset. For example, if the dataset associated with the entity includes data associated with transactions conducted by the entity over a time period, the determined set of features associated with the entity may comprise all of the resource provider names corresponding to the resource providers with which the entity conducted a transaction during the time period.

Steps 1002 and 1003 may be performed for each of the features in the set of features determined in step 1001. At step 1002, the server computer may determine a feature and label pair in the training model that includes the feature. At step 1003, the server computer may then determine the label in the feature and label pair determined in step 1002 and include the label in the set of predicted labels for the entity.

Steps 1002 and 1003 are described with respect to an exemplary case in which the training model includes significant feature and label pairs Resource Provider Name A→Resource Provider Category B, Resource Provider Name C→Resource Provider Category D, and Resource Provider Name E→Resource Provider Category F. If the feature of resource provider name A is being analyzed at step 1002, the server computer may determine that a feature and label pair exists in the training model that includes the feature of resource provider name A, namely Resource Provider Name A→Resource Provider Category B. At step 1003, the server computer may then determine the corresponding label. Resource Provider Category B, in the determined feature and label pair. The label of Resource Provider Category B may then be included in the predicted set of labels for the entity.

In some embodiments, the training model may include a plurality of significant feature and label pairs such that different features may lead to the same label. In this case, other information (e.g., probabilities) associated with the significant feature and label pairs may be utilized to determine which significant feature and label to choose at step 1002. This case is described with respect to the example below.

Steps 1002 and 1003 are described with respect to an exemplary case in which the training model may include significant feature and label pairs Resource Provider Name A→Resource Provider Category B, Resource Provider Name C→Resource Provider Category D, Resource Provider Name E→Resource Provider Category F, and Resource Provider Name A→Resource Provider Category G. If the feature of resource provider name A is being analyzed at step 1002, the server computer may determine that there are multiple significant feature and label pairs that exist in the training model and that include the feature of resource provider name A, namely Resource Provider Name A→Resource Provider Category B and Resource Provider Name A→Resource Provider Category G.

The server computer may thus utilize other information to compare significant feature and label pairs against each other and then select an appropriate significant feature and label pair. For example, this information may include $P(label_i|feature_j)$ values (e.g., conditional probability of label occurring given feature) determined in step 603 of FIG. 6 or corresponding bucketized values. In the former case, if $P(label_{category=B}|feature_{name=A}) < P(label_{category=G}|feature_{name=A})$, the server computer may determine that the Resource Provider Name A→Resource Provider Category G relationship is more likely to be meaningful compared to the Resource Provider Name A→Resource Provider Category B relationship. In the latter case, if the bucketized value corresponding to $P(label_{category=B}|feature_{name=A})$, is less than the bucketized value corresponding to $P(label_{category=G}|feature_{name=A})$, the server computer may similarly determine that the Resource Provider Name A→Resource Provider Category G relationship is more likely to be meaningful compared to the Resource Provider Name A→Resource Provider Category B relationship. Consequently, the server computer may select Resource Provider Name A→Resource Provider Category G at step 1002 and thus determine the label of Resource Provider Category G at step 1003 to be added to the set of predicted labels. A similar comparison process may be performed in cases in which more than two significant feature and label pairs leading to the same label exist. If no differentiation can be made between multiple significant feature and label pairs that lead to the same label, for example due to the fact that $P(label_{category=B}|feature_{name=A}) = P(label_{category=G}|feature_{name=A})$, a feature and label pair may be selected randomly from the multiple significant feature and label pairs.

While one exemplary method of selecting a feature and label pair from multiple feature and label pairs that lead to the same label is described above, embodiments are not so limiting. In some embodiments, the server computer may perform operations other than comparing the $P(label_i|feature_j)$ values or corresponding bucketized values associated with each of the multiple feature and label pairs and instead may perform any suitable computations utilizing the $P(label_i|feature_j)$ values or corresponding bucketized values as parameters. In other embodiments, the server computer may perform operations without the $P(label_i|feature_j)$ values or corresponding bucketized values. It is understood that no matter the type of operations performed during this selection process, it is presumed that the result of the operations can enable the server computer to recognize the feature and label pair that is likely to have the strongest relationship (e.g., highest likelihood that the label will occur based on the feature having occurred) and thus select the appropriate feature and label pair for determining the set of predicted labels.

After steps 1002 and 1003 have been performed for each of the features in the set of features, the set of predicted labels may include any suitable number of labels. In some embodiments, no labels may have been included in the set of predicted labels. This may indicate that no predictive relationships between features and labels can be determined based on the training model. In other embodiments, one or more labels may be included in the set of predicted labels. This may indicate that the entity is likely to be associated with the set of predicted labels in the future based on the training model. For example, if the set of predicted labels includes the label of Resource Provider Category B, this can indicate that the entity is predicted to be associated with Resource Provider Category B in the future. In the exemplary case described above in which the dataset associated with the entity that is analyzed in steps 1001 to 1003 is a transaction dataset, this can indicate that the entity (e.g., account holder) is likely to conduct a transaction associated with Resource Provider Category B in the future based on the training model.

While the exemplary case in which step 605 of FIG. 6 and steps 1001 to 1003 of FIG. 10 are performed for a dataset associated with a single entity is described for simplicity, embodiments are not so limited. For example, the server computer may perform these steps for data associated with multiple entities, where the server computer may determine (e.g., obtain) multiple datasets, each associated with one of the multiple entities. After performing step 605 of FIG. 6 and steps 1001 to 1003 of FIG. 10 for each of the multiple datasets, the resulting information may include a set of predicted labels comprising predicted labels determined for each of the multiple entities. In some cases, the set of predicted labels may be organized into multiple sets (e.g., subsets) of predicted labels based on an entity identifier (e.g., entity name, account identifier).

At step 606, the server computer may initiate an action based on the set of predicted labels. In some embodiments, initiating the action may comprise communicating with other devices. In other embodiments, initiating the action may comprise the server computer performing further processing based on the set of predicted labels. Exemplary actions, one or more of which the server computer may initiate, are described in further detail below.

In some embodiments, the server computer can initiate the action in step 606 by evaluating the generated training model in various ways. In some cases, the server computer may divide the set of predicted labels for each entity into repeat predictions and discovery predictions. The repeat predictions may include the predicted labels that are determined to have been associated with behavior associated with the entity in the past. In the exemplary case in which the feature and label pair being analyzed follows the relationship indicated by Resource Provider Name→Resource Provider Category and the dataset associated with the entity is a transaction dataset, the label Resource Provider Category B in the predicted set of labels can be determined to be a repeat prediction if the entity has previously conducted a transaction associated with Resource Provider Category B. On the other hand, the label Resource Provider Category B in the predicted set of labels can be determined to be a discovery prediction if the entity has not previously conducted a transaction associated with Resource Provider Category B.

To evaluate the training model, the server computer may then compare the predictions made for a certain time period in the future (e.g., corresponding to the length of time between T2 and T1 in FIG. 7) with data collected regarding the actual behavior by each entity when it is available. For example, for each label in the predicted set of labels for an entity, the server computer may determine whether the entity actually performed the predicted behavior associated with the label within the time period and utilize the result to improve the training model. In some cases, the server computer can determine a precision per label value, which may be determined by dividing the number of entities that actually performed a predicted behavior based on a label by the number of entities that were predicted to perform the predicted behavior based on the label. These precision per label values can provide ratios indicating the accuracy of the predictions made based on the training model. This evaluation process may be utilized to identify fine grained patterns based on numerous attributes and optimize the training model.

As described above, the methods described in at least FIG. 6, FIG. 8, and FIG. 10 can be utilized to build and utilize a model that can predict future occurrences given past or current occurrences. One of the advantages provided by these methods is that the model can be utilized to predict occurrences associated with an entity based on data that is not necessarily associated with the same entity. For example, while a system may not store any historical behavior information related to an entity, it may still be able to predict future behavior of the entity based on data analyzed for other entities. This can allow the system the flexibility to utilize the entity's predicted future behavior in various analyses.

In some embodiments, the server computer can initiate the action in step 606 by performing resource management services. In some cases, the server computer can itself perform the resource management services (e.g., send a recommendation for better managing resources to the entity), while in other cases, the server computer can send an instruction to a separate resource management system to perform the resource management services. Embodiments of the invention enable improved resource management as described below.

In typical systems, resource providers may not have sufficient access to information regarding predicted future behaviors. As a result, resource providers are not able to conduct optimally preparation for its activities. Embodiments of the invention solve this issue by enabling a system that can determine predicted future behavior at an entity level (e.g., individuals, specific resource provider, etc.). The ability for the model utilized in embodiments of the invention to provide predicted future behavior based on multiple dimensions of data (e.g., time, location, name, etc.) can enable resource providers to more accurately predict consumers that are expected to visit certain resource provider locations or websites and show interest in certain resources. Based on this information, resource providers can improve preparation of inventory, staffing of workers, or allocation of computing resources for processing communications more efficiently.

Other types of recommendations can be sent based on the set of predicted labels in different contexts. For example, if the travel routes of vehicles based on their GPS location data were to be analyzed, this may result in a set of predicted labels indicating streets and freeway exits that are expected to be traveled by a vehicle. The server computer may then send, based on the set of predicted labels, a recommendation to a driver of the vehicle indicating an alternative route or alternative transportation method in order to alleviate traffic congestion. In another example, if the set of predicted labels indicates the vehicles predicted to be traveling through a street during a certain time of day, the server computer may send, based on the set of predicted labels, a recommendation to a patrol officer indicating a street and a time at which the street may be worth monitoring. This may increase the chance that a driver can be held accountable for reckless driving, as it can be expected that the patrol office will be able to find vehicles exceeding the designated speed limit on an isolated street with only a few vehicles traveling through it.

In some embodiments, the server computer can initiate the action in step 606 by conducting fraud analyses. In some cases, the server computer can itself perform the fraud analyses (e.g., send an alert to the entity), while in other cases, the server computer can send an instruction for another fraud analysis system to perform the fraud analyses. Embodiments of the invention enable improved fraud analyses as described below.

In typical systems, fraud detection services rely on historical data associated with an entity to determine whether certain behavior by the entity is abnormal. However, for cases in which these systems do not have any information surrounding the entity, these fraud detection services cannot be utilized. As a result, various transactions may be conducted without implementing appropriate security measures. Thus, there is a need to circumvent such situations in which no fraud detection services can be applied.

Embodiments of the invention solve this issue by enabling a system that can determine predicted future behavior associated with an entity without having access to historical information associated with the entity. This predicted future behavior can be utilized as inputs into fraud detection services, which can increase security for processing transactions with new or unknown entities. This can decrease the chance of fraudulent transactions being erroneously authorized, which can forgo the need to conduct some electronic processing (e.g., authentication processing, message routing, etc.) that would typically occur as a result of reprocessing transactions. Consequently, the computer system as a whole may process transactions more efficiently.

In some embodiments, the server computer can initiate the action in step 606 by providing offers services. In some cases, the server computer can itself provide the offers services (e.g., send an offer to the entity), while in other cases, the server computer can send an instruction to a separate offers system to perform the offers services. Embodiments of the invention enable improved offers services as described below.

Since offer providing entities typically rely on historical data associated with an entity when determining whether to provide an offer, conventional offer providing entities are not able to effectively provide offers to new or unknown entities. Embodiments of the invention solve this issue by enabling a system that can determine predicted future behavior associated with an entity without having access to historical information associated with the entity. This predicted future behavior can be utilized as inputs into offer services, which allow targeted distribution of offers to new or unknown entities. Further, since the ability for the model utilized in embodiments of the invention to provide predicted future behavior based on multiple dimensions of data (e.g., time, location, name, etc.) and at an entity level (e.g., individuals, specific resource provider, etc.) can enable offer providing entities to improve their conversion rates.

The segmentation platform may process large amount of data at a time. In order to enable the system described herein to run as efficiently as possible, additional techniques can be utilized to further optimize the system. While not required, in some implementations, data processed by the system may be bucketized. This can enable certain values processed by the system to be stored in simplified forms.

There are several reasons for utilizing bucketization techniques. One reason is that utilizing bucketization enables ease of understanding. For example, integer values (e.g., buckets numbered from 1 to 10) can be more comprehensible and easier to handle than predictive values in other forms (e.g., probability values ranging between 0.0001 to 0.9999). Another reason is that utilizing bucketization provides consistency such that bucketized values are comparable across various contexts. For example, it may not be effective to utilize a predictive value determined for a certain entity operating in a specific context to compare the entity against other entities, since predictive values can be determined using a variety of methods. However, categorizing predictive values into buckets can provide a way to rank the predictions (e.g., from best to worst) regardless of the specific context under which they were determined. Hence, comparing predictions based on bucketized values can be more effective.

Figure 11:
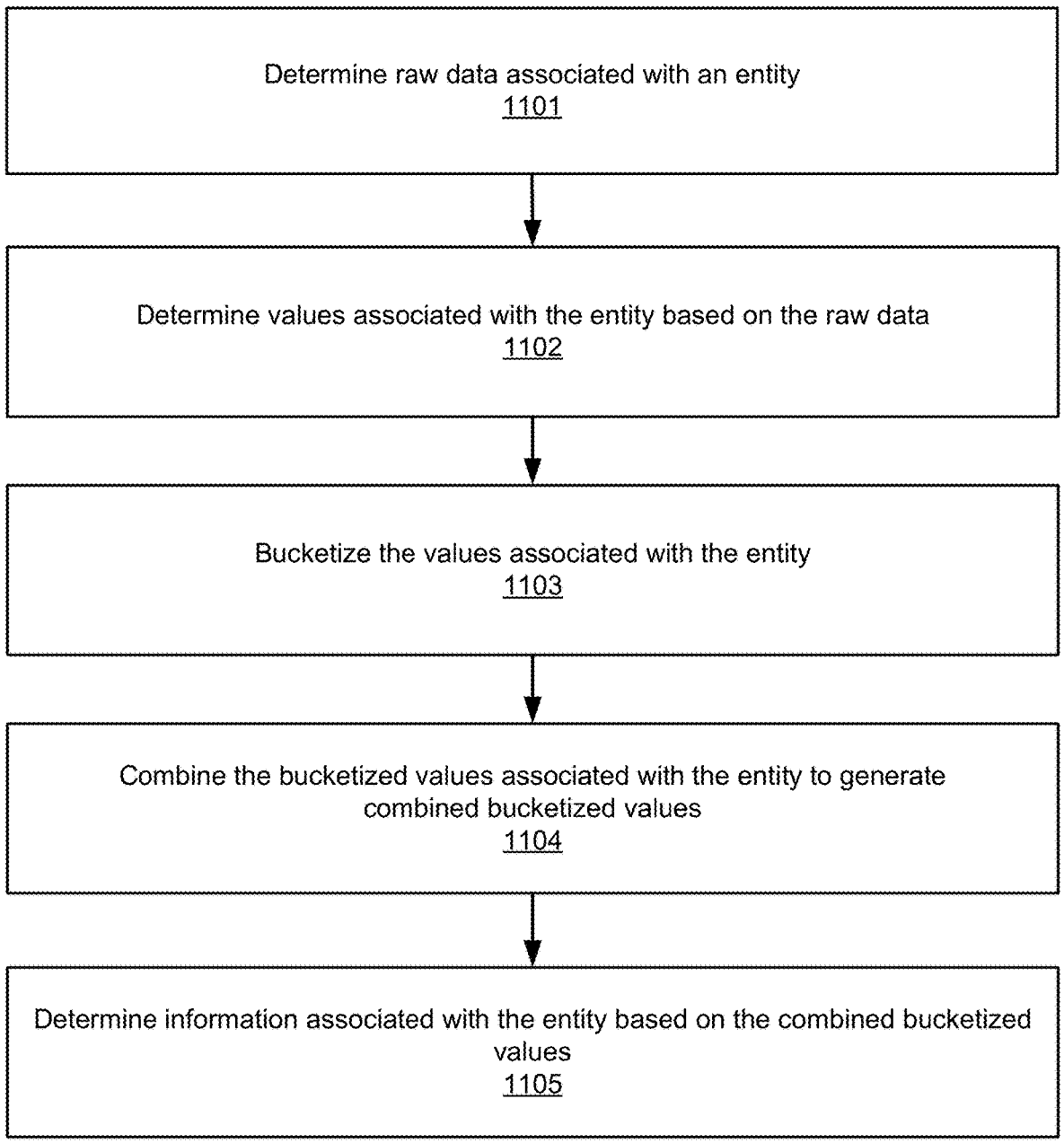
FIG. 11 shows an exemplary method for bucketizing data according to some embodiments of the invention.

FIG. 11 shows an exemplary flow 1100 for a bucketization method according to some embodiments of the invention. FIG. 11 may be performed by a server computer (e.g., service provider computer 106 of FIG. 1) that can comprise a bucketing engine. The bucketing engine may comprise one or more modules that enables, in conjunction with a data processor, steps 1101 to 1105.

At step 1101, the server computer may determine raw data associated with an entity. Raw data may be data that is in its original form without modifications to its volume, format, or values. In some embodiments, the raw data may be received from a raw data source device. In an exemplary case, raw data may include transaction data associated with transactions conducted by an entity and that can be received from a transaction processing entity device.

At step 1102, the server computer may determine values associated with the entity based on the raw data. These values may include behavior values determined by a behavior service of the server computer and predictive values determined by a predictive service of the server computer. In some embodiments, the server computer may generate behavior values and predictive values by performing operations (e.g., table joins, computations, aggregations, etc.) utilizing information in the raw data as inputs.

Behavior values may include any values that provide information about existing data. For example, raw transaction data may include information indicating the transaction amount and resource provider associated with each transaction conducted by the entity. Behavior values determined based on this raw data may include total transaction amounts spent by the entity at each resource provider and frequency of visits by the entity at each resource provider.

Predictive values may include any values that provide potential information about future data. In some cases, predictive values may be determined using a training model that can take some of the raw data as input. An exemplary predictive value may be a conditional probability of a label occurring in a dataset given a feature has occurred. A method for determining predictive values is described in more detail with respect to at least FIG. 6.

At step 1103, the server computer may bucketize the values associated with the entity. In some implementations, each type of behavior value and/or the predictive value can be bucketized to deciles, where each resulting bucketized values is assigned a value between 1 to 10 based on its magnitude relative to other values. Typically, values that are the same can be bucketed into the same bucket. It is understood that any other bucketing algorithms (e.g., utilizing a different number of total buckets) can be utilized that enable the conditional probability values to be compared, while being categorized into groups. An exemplary bucketing algorithm is shown below, where $N=(n_1, n_2, \ldots, n_k)$ may represent a list of k values (e.g., numbers) sorted in descending (or ascending) order, b may represent the desired number of bucket, and $b_{min}$ may represent the minimum number of items in each bucket. The bucketing algorithm may output b buckets including the bucketized k values.

```
num_buckets = b bucket_size = k/b if bucket_size < b_min then num_buckets = k/b_min end if
bucketTotalElements = 0
bucketNumber = 1
buckets = List.empty[ ]
bucketStart = MAX
for n_i ← N do
    bucketTotalElements += 1
    if bucketTotalElements > bucket_size & bucketNumber ! =
    num _buckets then
        buckets.append(bucketStart)
        bucketTotalElements = 0
        bucketNumber+= 1
        bucketStart = n_i
    end if
end for
buckets.append(bucketStart)
return buckets
```

The server computer can bucketize values by each type of behavior value or predictive value and based on their magnitude relative to other values within the same type. For example, the behavior values of total transaction amounts spent by the entity at each resource provider may be bucketized separately from the behavior values of the frequency of visits by the entity at each resource provider. Additionally, predictive values can be bucketized for a given label. For example, all conditional probabilities associated with a label of resource provider category may be bucketized.

At step 1104, the server computer may combine the bucketized values associated with the entity to generate combined bucketized values. In some embodiments, bucketized values including bucketized behavior data and bucketized predictive data, as well as corresponding dimension information (e.g., profile information) can first be combined into one or more tables. Table 1 below shows an exemplary table comprising bucketized values associated with an entity. For simplicity, the predictive value output by the predictive service is shown to be associated with the same dimension (e.g., at the resource provider level) as that of the bucketized behavior values. However, the data shown in the tables herein are not meant to be limiting.

TABLE 1

| Dimension (e.g., Resource Provider) | Bucketized Behavior Value 1 (e.g., bucketized total transaction amount) | Bucketized Behavior Value 2 (e.g., bucketized frequency of visits) | Bucketized Predictive Value (e.g., bucketized predictive propensity to visit the resource provider) |
|---|---|---|---|
| D1 | 3 | 1 | 2 |
| D2 | 4 | 1 | 2 |

In some embodiments, the server computer may further combine the bucketized values associated with the entity to generate combined bucketized value For example, the server computer may utilize mapping techniques to enable the bucketized values to be stored in one row of the table, rather than in multiple rows. This can enable the server computer to reduce storage space utilized to store data. Any suitable mapping techniques may be implemented, such as mapping values utilizing index and value pairs in arrays, key-value pair in hash tables, objects in lists, or other mechanisms. Table 2 below shows an exemplary table storing combined bucketized values generated based on data in Table 1.

TABLE 2

| Bucketized Behavior Value 1 Map | Bucketized Behavior Value 2 Map | Bucketized Predictive Value Map |
|---|---|---|
| {D1 → 3, D2 → 4} | {D1 → 1, D2 → 1} | {D1 → 2, D2 → 2} |

In some embodiments, the server computer may further combine the bucketized values associated with the entity to generate combined bucketized values. For example, the server computer may utilize concatenation techniques to enable the bucketized values to be stored in one column of the table, rather than in multiple columns. This can enable the server computer to further reduce storage space utilized to store data. In some cases, the bucketized values associated with a dimension can be combined into a single value (e.g., integer) by concatenating bits representing the bucketized values. For example, the bucketized values corresponding to dimension D1 include 3, 1, and 2, according to Table 1 and Table 2. It is noted that the bit representations for these bucketized values are $(0011)_2=(3)_{10}$, $(0001)_2=(1)_{10}$, and $(0010)_2=(2)_{10}$. If the order in which these bucketized values are concatenated is fixed, the resulting value may be equivalent to $(0011\ 0001\ 0010)_2=(786)_{10}$. Bucketized values corresponding to dimension D2 can be determined in a similar manner, such that the resulting value may be equivalent to $(0100\ 0001\ 0010)_2=(1042)_{10}$. Table 3 below shows an exemplary table storing combined bucketized values generated based on data in Table 1 or Table 2.

TABLE 3

| Bucketized Values Map |
|---|
| {D1 → 786, D2 → 1042} |

At step 1105, the server computer may determine information associated with the entity based on the combined bucketized values. In some embodiments, step 1105 may be performed at a later time, such as in response to a query for information associated with an entity. The process for extracting the information may differ based on the combined bucketized values stored by the server computer. If the server computer stores combined bucketized values in the form as demonstrated in Table 2, the server computer may extract bucketized values by identifying the appropriate column and then accessing the stored mapping to determine a value associated with a dimension. If the server computer stores combined bucketized values in the form as demonstrated in Table 3, the server computer may extract bucketized values by implementing a series of bitwise operations.

An exemplary series of bitwise operations that can be implemented to extract bucketized values is described with respect to data shown in Table 2 and Table 3. To obtain any of the bucketized values associated with dimension D2, the server computer may first lookup the combined bucketized value corresponding to D2 in the bucketized value map to obtain the value 1042 (See Table 3). The server computer may then implement an appropriate mask. For example, to retrieve the "Bucketized Predictive Value" corresponding to dimension D2 (See column 3 of Table 2), the server computer may perform a logical AND operation on the combined bucketized value, $(0100\ 0001\ 0010)_2=(1042)_{10}$, with the mask $(0000\ 0000\ 1111)_2$ in order to retrieve $(0000\ 0000\ 0010)_2$. The server computer may be able to determine the appropriate mask to utilize based on the order in which bucketized values were concatenated to generate the combine bucketized value at step 1104. For example, the mask $(11110000\ 0000)_2$ may be utilized to determine the "Bucketized Behavior Value 1" (See column 1 of Table 2) and the mask $(0000\ 1111\ 0000)_2$ may be utilized to determine the "Bucketized Behavior Value 2" (See column 2 of Table 2).

While flow 1100 shows an exemplary method for bucketization that may be performed for data associated with a single entity, it is understood that the method may be repeated for data associated with any number of entities. In this case, any of the tables comprising combined bucketized values described above, such as Tables 1, 2, and 3, may comprise data associated with multiple entities. Table 4 below shows an exemplary table comprising combined bucketized values similar to those shown in Table 2, but for multiple entities. Table 5 below shows an exemplary table comprising combined bucketized values similar to those shown in Table 3, but for multiple entities.

TABLE 4

| Entity | Bucketized Behavior Value 1 Map | Bucketized Behavior Value 2 Map | Bucketized Predictive Value Map |
|---|---|---|---|
| Entity A | {D1 → 3, D2 → 4} | {D1 → 1, D2 → 1} | {D1 → 2, D2 → 2} |
| Entity B | {D1 → 2, D2 → 2} | {D1 → 1, D2 → 1} | {D1 → 1, D2 → 2} |
| Entity C | {D1 → 1, D2 → 1} | {D1 → 1, D2 → 1} | {D1 → 1, D2 → 1} |
| Entity D | {D1 → 4, D2 → 3} | {D1 → 1, D2 → 2} | {D1 → 2, D2 → 2} |
| Entity E | {D1 → 3, D2 → 4} | {D1 → 1, D2 → 1} | {D1 → 2, D2 → 2} |

TABLE 5

| Entity | Bucketized Values Map |
|---|---|
| Entity A | {D1 → 786, D2 → 1042} |
| Entity B | {D1 → 529, D2 → 530} |
| Entity C | {D1 → 273, D2 → 273} |
| Entity D | {D1 → 1042, D2 → 802} |
| Entity E | {D1 → 786, D2 → 1042} |

In some embodiments, the server computer may implement techniques to further reduce storage space when storing data associated with multiple entities. In some cases, the server computer can aggregate data based on similar values in a table. For example, the server computer can forgo the need to store the "Entity" column of Table 5 by aggregating data based on similar bucketized values maps. Table 6 below shows an exemplary table resulting, from, aggregating data based on similar bucketized values maps.

TABLE 6

| Bucketized Values Map | Count |
|---|---|
| {D1 → 786, D2 → 1042} | 2 |
| {D1 → 529, D2 → 530} | 1 |
| {D1 → 273, D2 → 273} | 1 |
| {D1 → 1042, D2 → 802} | 1 |

Storing data in a format such as that shown in Table 6 can enable the server computer to provide quicker responses to certain queries for information associated with entities. Such an exemplary query may be "find the number of entities that have a high "Bucketized Behavior Value 2" for dimension D1, but a low "Bucketized Behavior Value 1" for dimension D2." In response, the server computer may determine the combined bucketized values that indicate the bucket indicating a high value (e.g., bucket 1) for "Bucketized Behavior Value 2" for dimension D1 and a low value (e.g., bucket 4) for "Bucketized Behavior Value 2" for dimension D2. The server computer can then easily determine, based on associated data stored in Table 6, that there are two entities that fit these characteristics. If the query requests for identification information regarding the specific entities that fit these characteristics, the server computer can then refer back to the combined bucketized values as stored in Table 5 and determine that the entities include entity A and entity E.

Embodiments of the invention enables storage of data in various formats, which can allow more efficient analysis of data. In some embodiments, any of raw data values, behavioral data values, predictive data values, bucketized values, and combined bucketized values may be stored. In some cases, bucketized values and combined bucketized values may be stored utilizing one or more of the various formats shown in Table 1 through 6. Data stored in various formats may be utilized to respond to specific queries as described above, which can enable flexibility and optimize efficiency.

In some embodiments, queries received by the segmentation platform described herein can be configured and sent by a user utilizing interactive user interfaces. Some exemplary user interfaces are described with respect to FIG. 12 to FIG. 16. The user interfaces may be displayed on any suitable computing device operable by the user. In some embodiments, the user interfaces may be displayed as part of an application or web page hosted by the segmentation platform. The user may utilize the application or web page to determine information related to a segment of entities sharing common characteristics and perform an action (e.g., route information to other interested parties) based on the determined information. The user may be any suitable entity that has an interest in determining patterns among events, such as a transportation management entity, a criminal investigation entity, a transaction processing entity, a resource providing entity, or other entity.

It is understood that the exemplary user interfaces shown in FIG. 12 to FIG. 16 are not meant to be limiting. For example, various display formats and user interface elements (e.g., buttons, text input fields, etc.) other than those shown may be utilized as one of ordinary skill in the art would recognize. Further, the user interfaces may include additional components not explicitly shown that enable other functionalities (e.g., performing analyses, sending analyses results, generating recommendations, sending recommendations, generating offers, sending offers, etc.). The components of the user interfaces may be combined, mixed, and matched.

Figure 12:
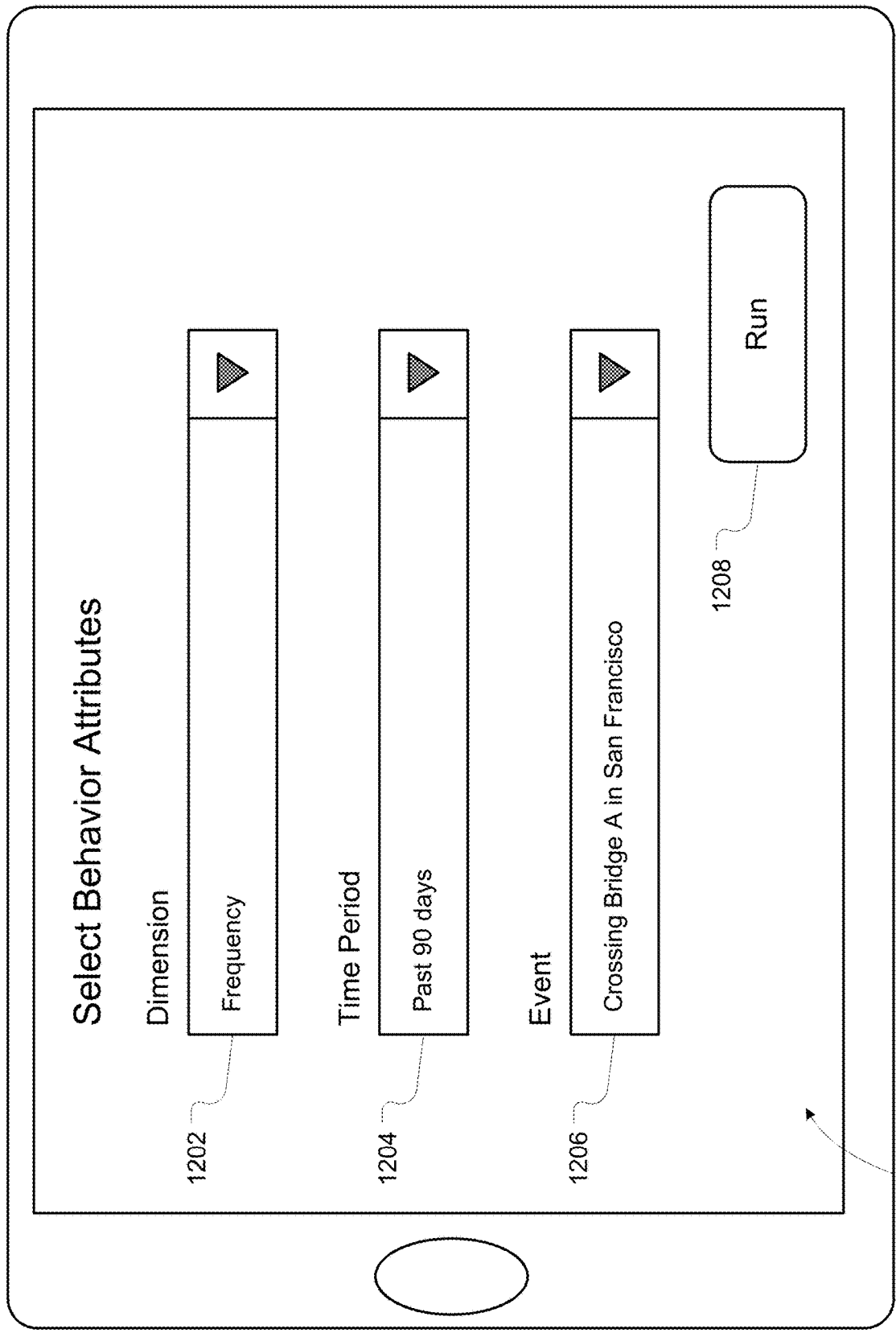
FIG. 12 shows an exemplary user interface according to some embodiments of the invention.

FIG. 12 shows an exemplary user interface 1200 that can be utilized to selecting behavior attributes for a segment according to some embodiments of the invention. The user interface 1200 can enable a user to configure behavior attributes for determining a segment of entities. In some embodiments, the user may utilize user interface 1200 to select a dimension 1202, a time period 1204, and an event 1206. Dimension 1202 may be associated with a measurable value that can be utilized to quantify the degree to which the dimension pertains to event 1206. Time period 1204 may indicate the time period over which the dataset from which the segment is to be determined spans. Event 1206 may indicate the type of occurrence to be analyzed.

In an exemplary case, the dataset being analyzed may include information determined based on GPS information from vehicles. For example, the dataset may include information related to travel routes (e.g., roads traveled, exits utilized, timestamps, speed, etc.) associated with vehicles. The user may wish to determine a segment of vehicles from the dataset that exhibits a number of characteristics. For example, the user may want to find a group of vehicles that did not cross Bridge A in San Francisco that often in the past 90 days. Accordingly, the user can then input dimension 1202 as "Frequency," time period 1204 as "Past 90 days," and event 1206 as "Crossing Bridge A in San Francisco." The user can then activate a user interface element 1208, which may be in the form of a "Run" button," to profile the segment corresponding to the selected behavior attributes. Exemplary results are shown with respect to FIG. 13.

Figure 13:
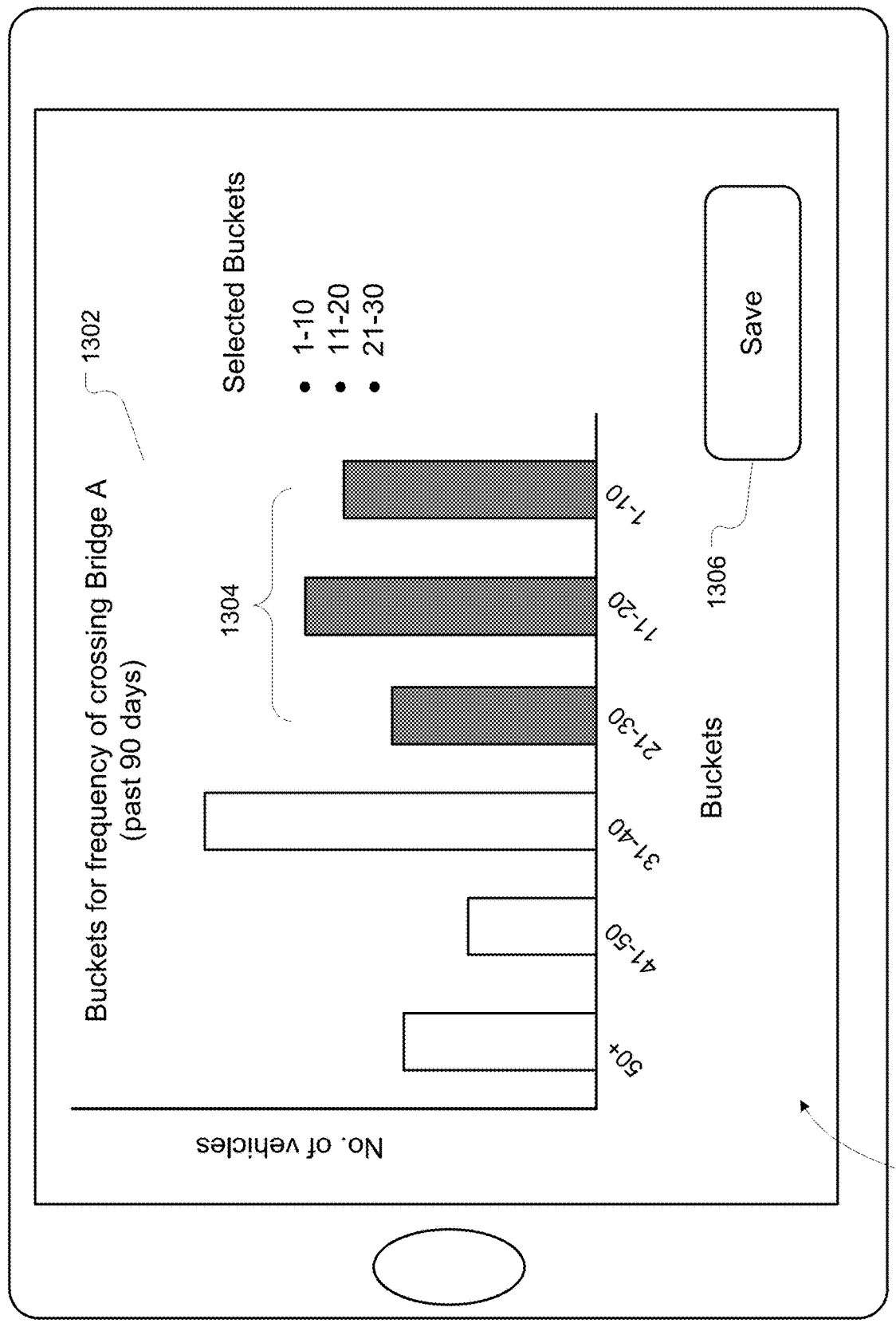
FIG. 13 shows an exemplary user interface according to some embodiments of the invention.

FIG. 13 shows an exemplary user interface 1300 that can be utilized to select entities for a segment according to some embodiments of the invention. The user interface 1300 may allow the user to view results of the query submitted for behavior attributes, such as those shown in FIG. 12. In some embodiments, user interface 1300 may comprise a metrics representation 1302. The metrics representation 1302 may be any suitable information (e.g., graph, chart, table, etc.) that can allow the user to view information regarding entities, vehicles in this case, relative to the submitted query. In some cases, metrics representation 1302 may include a graph that shows the number of entities in certain bucket ranges for an analyzed dimension. For example, looking at FIG. 13, metrics representation 1302 shows a bar graph indicating the number of vehicles that fall into certain buckets relative to the frequency at which they crossed Bridge A in the past 90 days. In this exemplary case, higher numbered buckets may correspond to vehicles associated with a higher frequency, while lower numbered buckets may correspond to vehicles associated with a lower frequency.

As described above, the user may wish to determine a group of vehicles that did not cross Bridge A in San Francisco that often in the past 90 days. Accordingly, the user may choose to focus on select vehicles that they believe best fit this characteristic, namely those associated with buckets 1 through 30. In some embodiments, user interface 1300 may provide a mechanism that, enables the user to save information associated with the select vehicles. For example, the user may be able to select user interface elements 1304, which may include the portion of metrics representation 1302 corresponding to buckets 1 through 30. Subsequently, the user may activate a user interface element 1306, which may be in the form of a "Save" button," to save information related to the vehicles corresponding to the selected buckets. In some embodiments, the saved information may include information indicating the frequency at which the vehicles crossed Bridge A in the past 90 days, as well as all or some information associated with the selected vehicles from the original dataset, which may include information related to travel routes (e.g., roads traveled, exits utilized, timestamps, speed, etc.).

Figure 14:
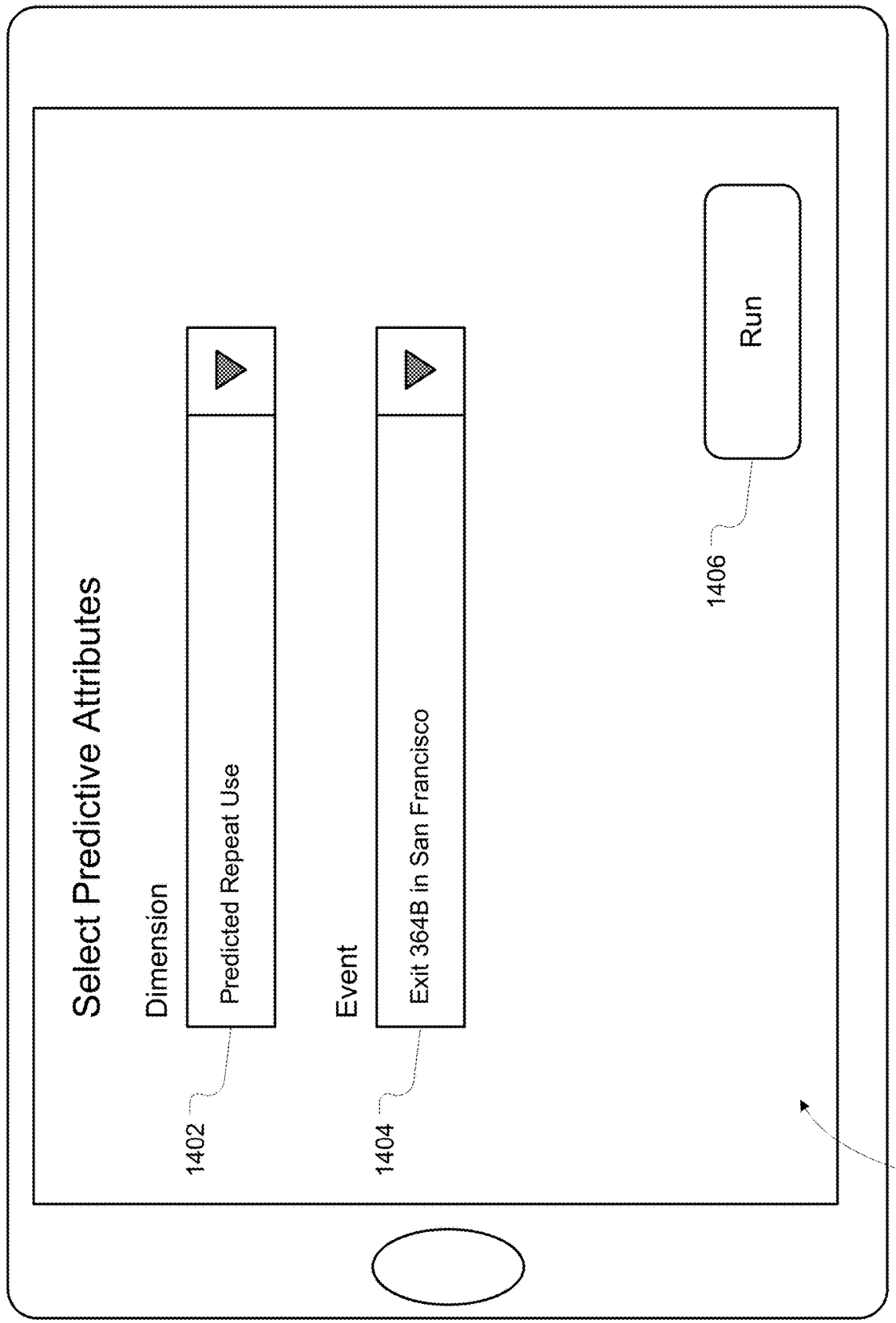
FIG. 14 shows an exemplary user interface according to some embodiments of the invention.

FIG. 14 shows an exemplary user interface 1400 that can be utilized to select predictive attributes for a segment according to some embodiments of the invention. The user interface 1400 can enable a user to configure predictive attributes for determining a segment of entities. In some embodiments, the user may utilize user interface 1400 to select a dimension 1402, and an event 1404. Dimension 1202 may be associated with a measurable value that can be utilized to quantify the degree to which the dimension pertains to event 1404. Event 1404 may indicate the type of occurrence to be analyzed.

In an exemplary case, the user may want to analyze whether vehicles are likely to repeat use of Exit 364B in San Francisco in the future. Accordingly, the user may select "predicted repeat user" for dimension 1402 and "Exit 364B in San Francisco" for event 1404. In some embodiments, the user may analyze the selected predictive attributes for the same dataset as that analyzed with respect to FIG. 12. This may result in an output of information indicating all vehicles in the dataset that are likely to utilize Exit 364B in San Francisco in the future. In other embodiments, the user may analyze the selected predictive attributes for only the segment of vehicles selected with respect to FIG. 13. This can allow the user to analyze the selected predictive attributes for just the vehicles that did not cross Bridge A in San Francisco that often in the past 90 days. This can result in an output of information indicating whether vehicles that did not cross Bridge A in San Francisco that often in the past 90 days, are likely to utilize Exit 364B in San Francisco in the future. After the user has selected values for dimension 1402 and event 1404, the user may then activate a user interface element 1406, which may be in the form of a "Run" button," to profile the segment corresponding to the selected predictive attributes. Exemplary results are shown with respect to FIG. 15.

Figure 15:
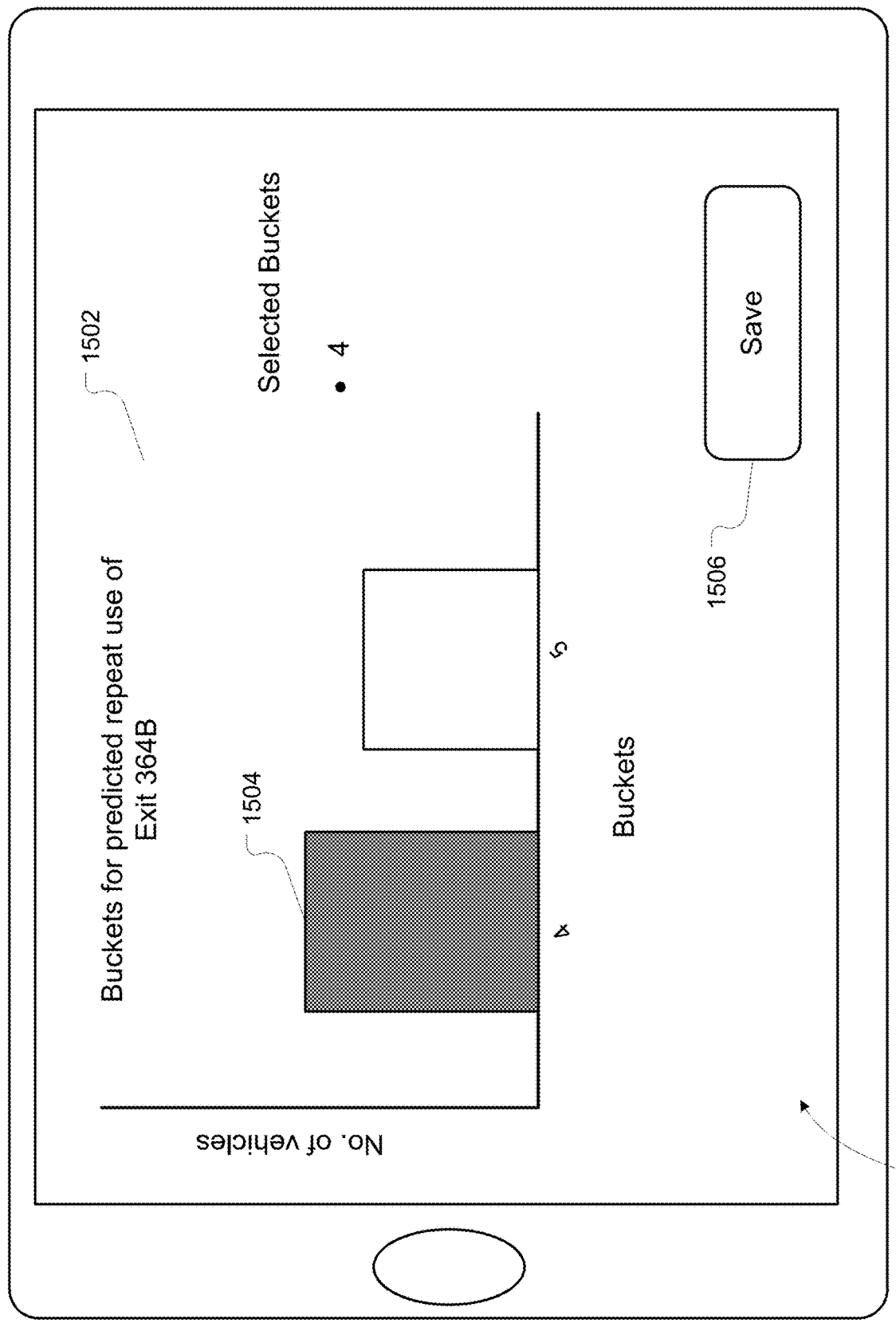
FIG. 15 shows an exemplary user interface according to some embodiments of the invention.

FIG. 15 shows an exemplary user interface 1500 that can be utilized to select entities for a segment according to some embodiments of the invention. The user interface 1500 may allow the user to view results of the query submitted for predictive attributes, such as those shown in FIG. 12. In some embodiments, user interface 1500 may comprise a metrics representation 1502. The metrics representation 1502 may be any suitable information (e.g., graph, chart, table, etc.) that can allow the user to view information regarding entities, vehicles in this case, relative to the submitted query. In some cases, metrics representation 1502 may include a graph that shows the number of entities in certain bucket ranges for an analyzed dimension. For example, looking at FIG. 15, metrics representation 1502 shows a bar graph indicating the number of vehicles that fall into certain buckets relative to the likelihood that they will use Exit 364B in the future. In this exemplary case, higher numbered buckets may correspond to vehicles associated with a lower likelihood, while lower numbered buckets may correspond to vehicles associated with a higher likelihood.

The user may wish to determine a group of vehicles that are expected to utilize Exit 364B in the future. Accordingly, the user may choose to focus on select vehicles that they believe best fit this characteristic, namely those associated with bucket 4. In some embodiments, user interface 1500 may provide a mechanism that enables the user to save information associated with the select vehicles. For example, the user may be able to select user interface element 1504, which may include the portion of metrics representation 1502 corresponding to bucket 4. Subsequently, the user may activate a user interface element 1506, which may be in the form of a "Save" button," to save information related to the vehicles corresponding to the selected bucket. In some embodiments, the saved information may include information indicating the likelihood (e.g., probability scores) that the vehicles will utilize Exit 3648, as well as all or some information associated with the selected vehicles from the original dataset, which may include information related to travel routes (e.g., roads traveled, exits utilized, timestamps, speed, etc.).

Figure 16:
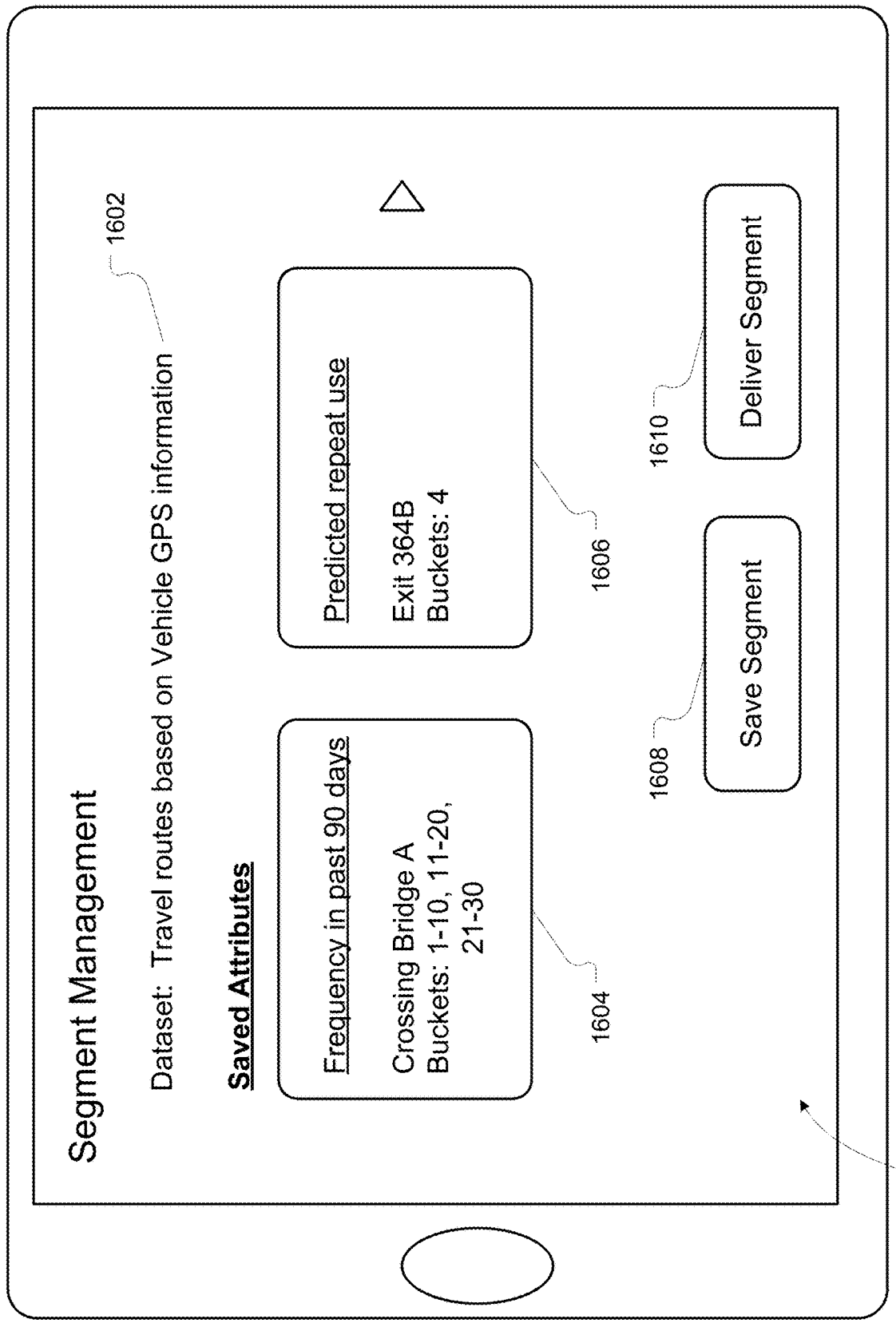
FIG. 16 shows an exemplary user interface according to some embodiments of the invention.

FIG. 16 shows an exemplary user interface 1600 that can be utilized to save and deliver information related to a segment according to some embodiments of the invention. In some embodiments, the user interface element 1602 may display an indication of the dataset was analyzed to determine the segment. The user interface 1600 may also display information related to the behavior attributes and/or predictive attributes configured and saved by the user for a segment of entities. For example, user interface element 1604 may present a summary of information related to the selected behavior attributes, while user interface element 1606 may present a summary of information related to selected predictive attributes. In some cases, user interface elements 1604 and 1601 may be activated (e.g., clicked) to show further detailed information regarding selected behavior attributes and predictive attributes. In this exemplary case shown in FIG. 16, the user may have saved attributes for a segment of vehicles that were determined to not have crossed Bridge A in San Francisco that often in the past 90 days and that were determined to likely utilize Exit 364B in the future. While not shown in the exemplary case shown in FIG. 16, any suitable number of behavior attributes and/or predictive attributes may be selected for a segment.

After the user has completed building a segment based on selected attributes, the user can activate a user interface element 1608, which may be in the form of a "Save Segment" button," to save information related to the segment. In some embodiments, this may cause the user to be prompted with entry of information to be associated with the saved segment, such as a segment name, notes, and other details that may be useful for the user. The user may be able to refer to information associated with the saved segment at any time. For example, the information associated with the segment saved shown in FIG. 16 may include vehicle identification information (e.g., registration number), vehicle travel route information (e.g., roads traveled, exits utilized, timestamps, speed, etc.), number of vehicles in segment, or other data.

The user may be able to send some or all information associated with a saved segment by activating a user interface element 1610, which may be in the form of a "Deliver Segment" button. In some embodiments, this may cause the user to be prompted with entry of information regarding delivery of the segment, such as recipient identification information (e.g., recipient name, recipient location, etc.), method of delivery (e.g., email, text, etc.), and destination information (e.g., email address, phone number, etc.). In some embodiments, the user may send information related to a segment to an interested party. For example, the user may send the information related to the segment of vehicles that were determined to not have crossed Bridge A in San Francisco that often in the past 90 days and to likely utilize Exit 364B in the future to a transportation agency, which may be trying to find a remedy for traffic congestion in a particular region. Based on received information related to this segment, the transportation agency may be able to perform an action to alleviate the traffic congestion issue. For example, if Exit 364B typically has large amounts of traffic, it may be desirable for some vehicles to utilize Bridge A instead, which may lead to a similar destination. The transportation agency may then provide some incentive (e.g., provide discounted toll fee, send suggestions for alternative route, etc.) for the vehicles identified in the segment to cross Bridge A instead of utilizing Exit 364B in the future.

While one exemplary use case is described with respect to FIG. 12 to FIG. 16, it is understood that similar user interfaces may be modified for uses in other contexts. For example, a user may want to know about a group of shoppers that are low spenders at a certain resource provider X associated with a resource provider category Y, but are likely to spend a high transaction amount at other resource providers associated with the resource provider category Y in the future. In this case, the user may select behavior attributes corresponding to a dimension of "spend amount," any desired time period, an event of "conduct transaction at resource provider X," and predictive attributes corresponding to a dimension of "repeat transaction" and an event of "conduct transaction at resource provider category Y." The user may send information associated with the resulting segment of shoppers to an interested entity, such as a fraud detection system or offer providing entity.

Any of the computer systems mentioned herein may utilize any suitable number of subsystems. In some embodiments, a computer system includes a single computer apparatus, where the subsystems can be the components of the computer apparatus. In other embodiments, a computer system can include multiple computer apparatuses, each being a subsystem, with internal components. A computer system can include desktop and laptop computers, tablets, mobile phones and other mobile devices.

The subsystems in a computer system may be interconnected via a system bus. Additional subsystems can include a printer, keyboard, storage device(s), monitor, which is coupled to a display adapter, and others. Peripherals and input/output (I/O) devices, which couple to an I/O controller, can be connected to the computer system by any number of means known in the art such as an input/output (I/O) port (e.g., USB, FireWire®). For example, the I/O port or external interface (e.g. Ethernet, Wi-Fi, etc.) can be used to connect the computer system to a wide area network such as the Internet, a mouse input device, or a scanner. An interconnection via system bus can allow the central processor to communicate with each subsystem and to control the execution of instructions from system memory or the storage device(s) (e.g., a fixed disk, such as a hard drive, or optical disk), as well as the exchange of information between subsystems. The system memory and/or the storage device(s) may embody a computer readable medium. Another subsystem is a data collection device, such as a camera, microphone, accelerometer, and the like. Any of the data mentioned herein can be output from one component to another component and can be output to the user.

A computer system can include a plurality of the same components or subsystems, e.g., connected together by an external interface or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, units, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of example embodiments of the invention has been presented for the purposes of illustration and description. It is not intended to be exhaustive or to limit the invention to the precise form described, and many modifications and variations are possible in light of the teaching above.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned herein are incorporated by reference in their entirety for all purposes. None is admitted to be prior art.

What is claimed is:

1. A method comprising performing, by a server computer:
    determining a dataset collected over a time period;
    determining a plurality of feature and label pairs associated with the dataset;
    for each of the plurality of feature and label pairs:
    determining whether a feature and label pair is significant, wherein significant is when a probability that the feature and label pair will occur in the dataset is greater than a probability that a label will occur in the dataset;
    upon determining that the feature and label pair is significant, adding the feature and label pair to a training model;
    after determining that the feature and label pair is significant, updating the training model with the feature and label pair that is determined to be significant;
    predicting a set of labels for an entity using the updated training model; and
    initiating an action using the set of predicted labels that were predicted for the entity with the updated training model.

2. The method of claim 1, wherein determining the plurality of feature and label pairs associated with the dataset comprises:
    determining a feature dataset based on a first subset of the dataset;
    determining a label dataset based on a second subset of the dataset, wherein the first subset corresponds to data collected at an earlier time within the time period than that of the data corresponding to the second subset; and
    determining the plurality of feature and label pairs that co-occur based on the feature dataset and the label dataset.

3. The method of claim 2, wherein determining that the feature and label pair, including a feature and the label, is significant further comprises:
    determining a conditional probability of the label occurring in the dataset given the feature has occurred in the dataset; and
    determining that the conditional probability is greater than the probability of the label occurring in the dataset.

4. The method of claim 3, wherein determining the set of predicted labels for the entity comprises:
determining a set of features associated with the entity;
for each feature in the set of features:
determining a feature and label pair in the training model that includes the feature; and
determining the label in the feature and label pair.

5. The method of claim 4, wherein determining the set of predicted labels for the entity further comprises:
for each feature in the set of features:
determining multiple feature and label pairs in the training model that include the feature; and
determining, from the multiple feature and label pairs, the feature and label pair that is associated with a largest conditional probability of the label occurring in the dataset given the feature has occurred in the dataset.

6. The method of claim 1, wherein the dataset is a first dataset, further comprising:
determining a second dataset corresponding to data collected after the time period; and
evaluating the training model by determining a number of labels from the set of predicted labels occurring in the second dataset associated with the entity.

7. The method of claim 3, further comprising:
bucketizing data associated with the entity to determine bucketized values;
generating combined bucketized values including the bucketized values; and
storing the combined bucketized values.

8. The method of claim 7, wherein bucketizing data associated with the entity comprises:
for each feature and label pair determined to be significant:
bucketizing the conditional probability of the label occurring in the dataset given the feature has occurred in the dataset.

9. The method of claim 8, further comprising:
receiving a query for information associated with the entity;
obtaining the combined bucketized values; and
determining the information based on the combined bucketized values.

10. The method of claim 1, wherein the action comprises sending one or more of a recommendation, an alert, or an offer to the entity.

11. A server computer comprising:
a processor; and
a computer readable medium coupled to the processor, the computer readable medium comprising code executable to perform a method comprising:
determining a dataset collected over a time period;
determining a plurality of feature and label pairs associated with the dataset; for each of the plurality of feature and label pairs:
determining whether a feature and label pair is significant, wherein significant is when a probability that the feature and label pair will occur in the dataset is greater than a probability that a label will occur in the dataset;
upon determining that the feature and label pair is significant, adding the feature and label pair to a training model,
after determining that the feature and label pair is significant, updating the training model with the feature and label pair that is determined to be significant;
predicting a set of labels for an entity using the training model; and
initiating an action using the set of predicted labels that were predicted for the entity with the updated training model.

12. The server computer of claim 11, wherein the step of determining the plurality of feature and label pairs associated with the dataset in the method comprises:
determining a feature dataset based on a first subset of the dataset;
determining a label dataset based on a second subset of the dataset, wherein the first subset corresponds to data collected at an earlier time within the time period than that of the data corresponding to the second subset; and
determining the plurality of feature and label pairs that co-occur based on the feature dataset and the label dataset.

13. The server computer of claim 12, wherein the step of determining that the feature and label pair, including a feature and the label, is significant in the method further comprises:
determining a conditional probability of the label occurring in the dataset given the feature has occurred in the dataset; and
determining that the conditional probability is greater than the probability of the label occurring in the dataset.

14. The server computer of claim 13, wherein the step of determining the set of predicted labels for the entity in the method comprises:
determining a set of features associated with the entity;
for each feature in the set of features:
determining a feature and label pair in the training model that includes the feature; and
determining the label in the feature and label pair.

15. The server computer of claim 14, wherein the step of determining the set of predicted labels for the entity in the method further comprises:
for each of the features in the set of features:
determining multiple feature and label pairs in the training model that include the feature; and
determining, from the multiple feature and label pairs, the feature and label pair that is associated with a largest conditional probability of the label occurring in the dataset given the feature has occurred in the dataset.

16. The server computer of claim 11, wherein the dataset is a first dataset, wherein the method further comprises:
determining a second dataset corresponding to data collected after the time period; and
evaluating the training model by determining a number of labels from the set of predicted labels occurring in the second dataset associated with the entity.

17. The server computer of claim 13, wherein the method further comprises:
bucketizing data associated with the entity to determine bucketized values;
generating combined bucketized values including the bucketized values; and
storing the combined bucketized values.

18. The server computer of claim 17, wherein the method further comprises:
for each feature and label pair determined to be significant:
bucketizing the conditional probability of the label occurring in the dataset given the feature has occurred in the dataset.

19. The server computer of claim 18, wherein the method further comprises:
   receiving a query for information associated with the entity;
   obtaining the combined bucketized values; and
   determining the information based on the combined bucketized values.

20. The method according to claim 1, wherein each of the plurality of feature and label pairs are associated with resource provider information, and wherein the dataset is a transaction dataset.

* * * * *